Dec. 26, 1950   H. G. BUSIGNIES   2,535,038
POSITION INDICATOR SYSTEM
Filed Jan. 26, 1946   8 Sheets-Sheet 1

INVENTOR.
HENRI G. BUSIGNIES
BY
ATTORNEY

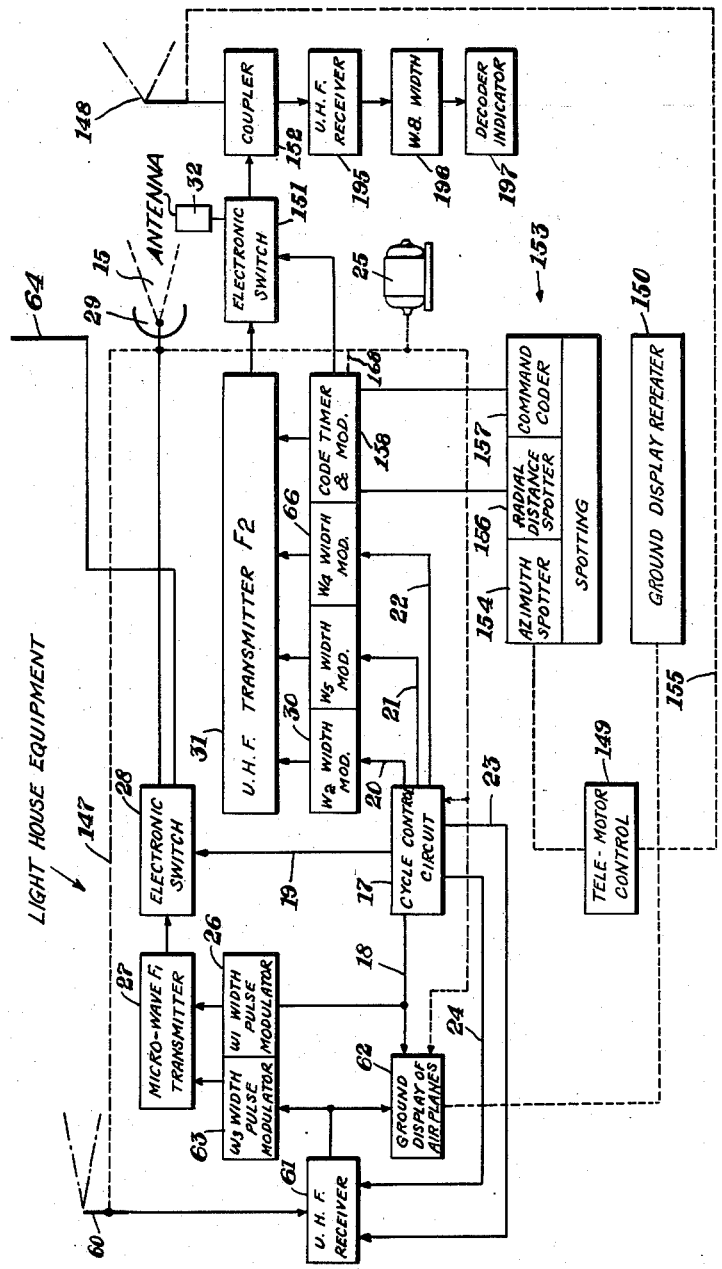

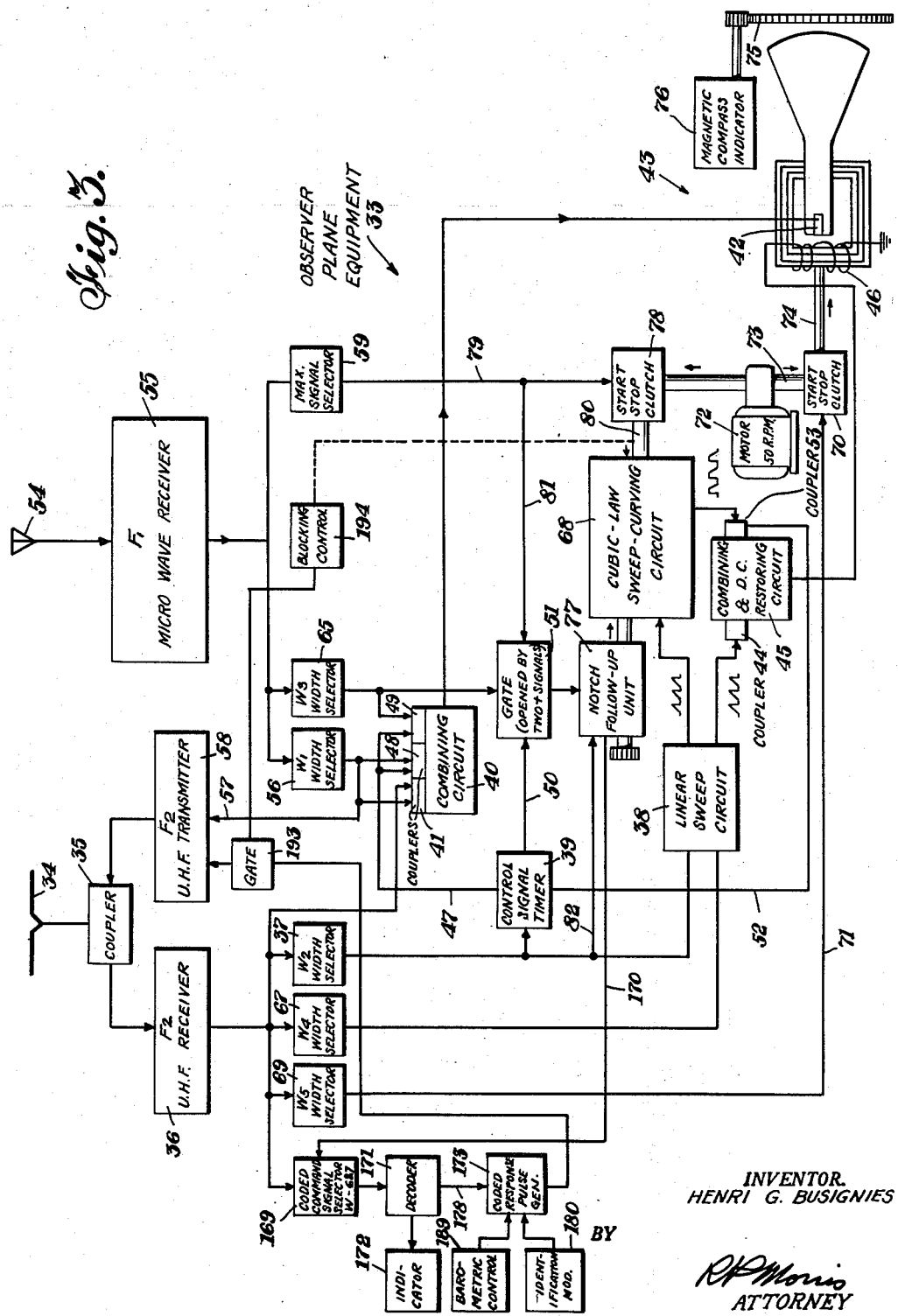

INVENTOR.
HENRI G. BUSIGNIES
BY
ATTORNEY

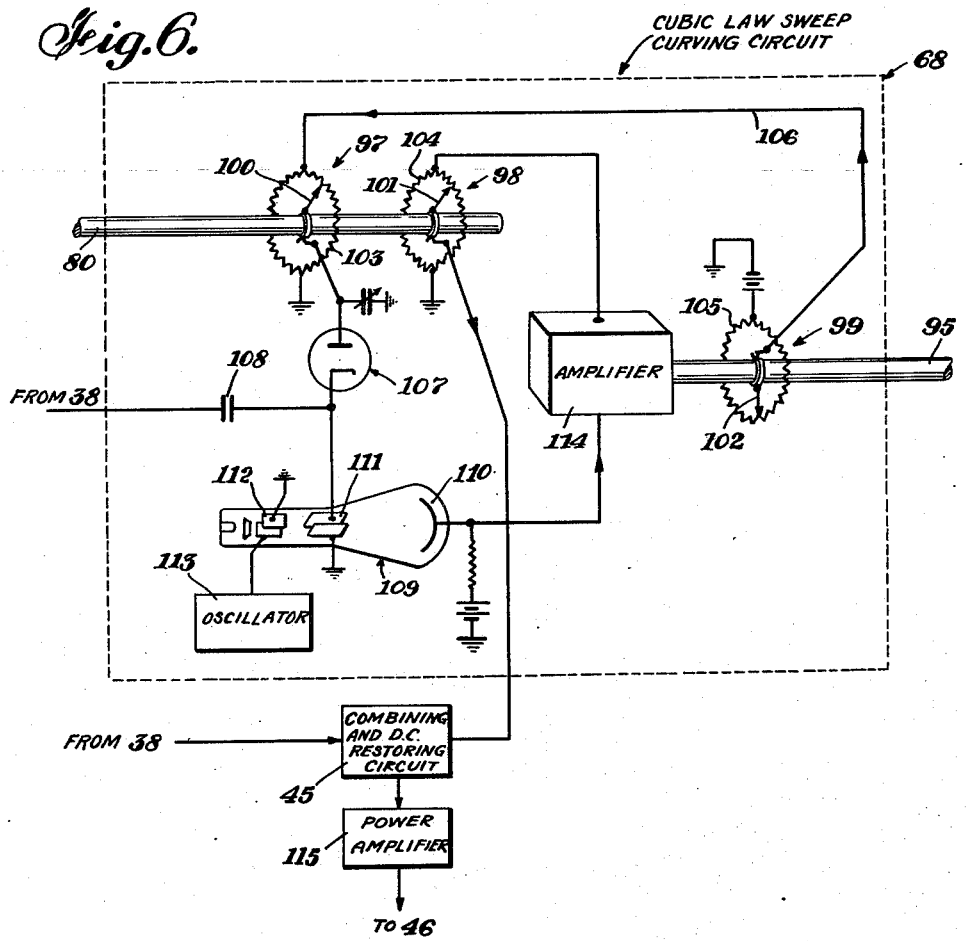
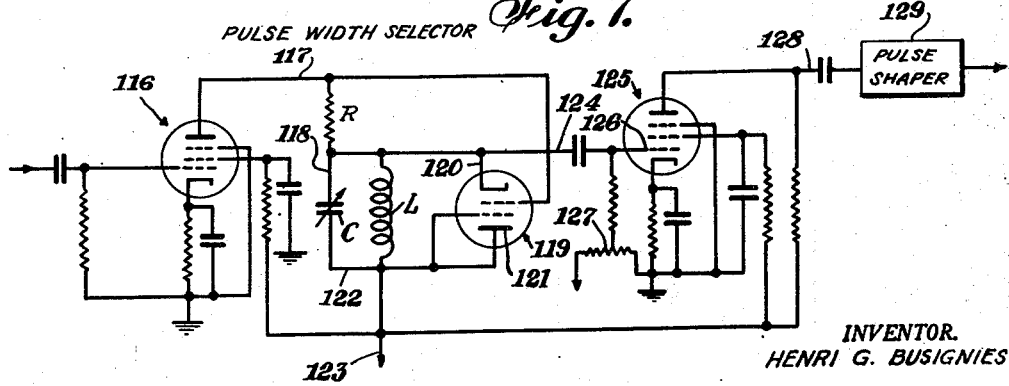

Dec. 26, 1950  H. G. BUSIGNIES  2,535,038
POSITION INDICATOR SYSTEM
Filed Jan. 26, 1946  8 Sheets-Sheet 6
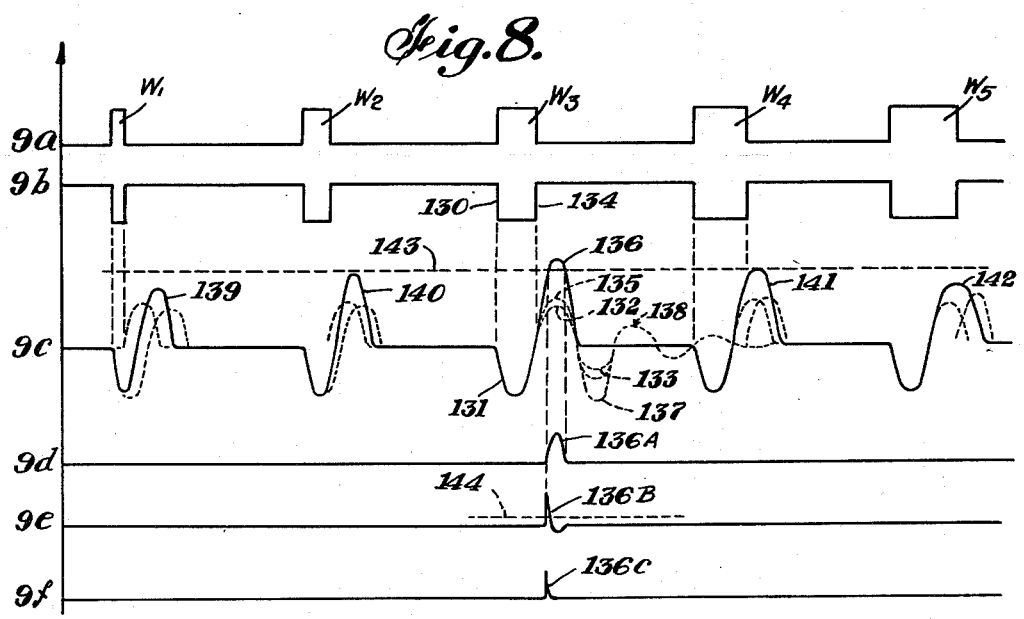
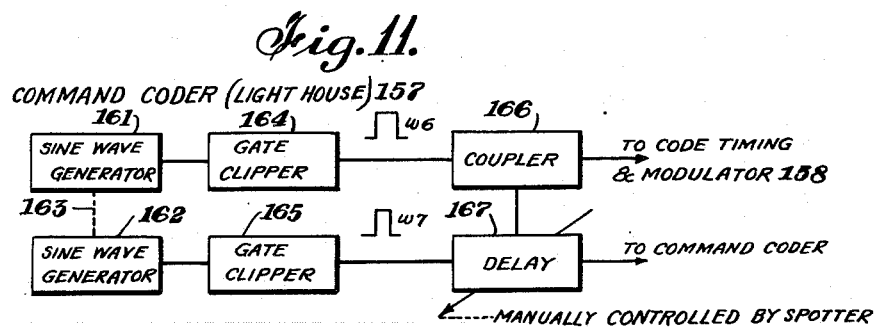
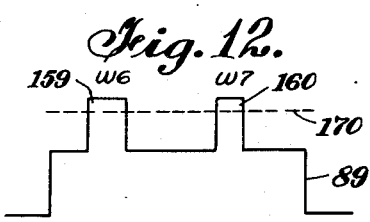
INVENTOR.
HENRI G. BUSIGNIES
BY
ATTORNEY

INVENTOR.
HENRI G. BUSIGNIES
BY
ATTORNEY

Dec. 26, 1950  H. G. BUSIGNIES  2,535,038
POSITION INDICATOR SYSTEM
Filed Jan. 26, 1946  8 Sheets-Sheet 8
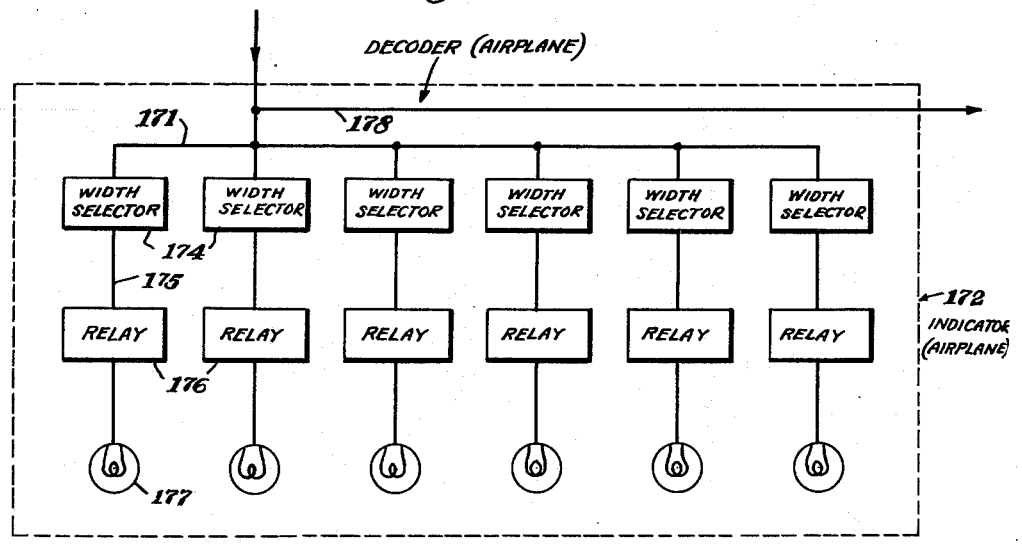
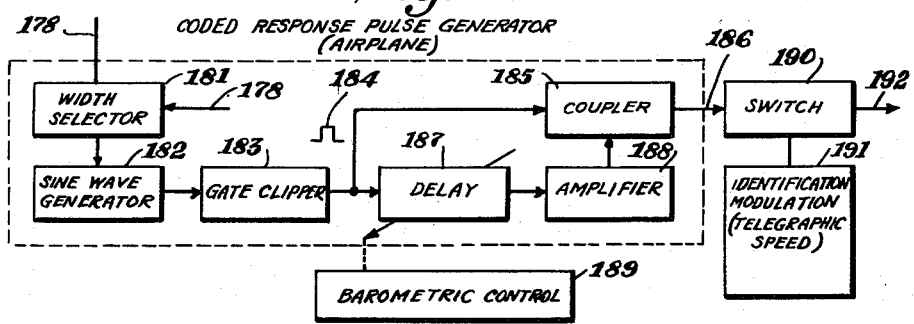
INVENTOR.
HENRI G. BUSIGNIES
BY
ATTORNEY Patented Dec. 26, 1950

2,535,038

UNITED STATES PATENT OFFICE 2,535,038

POSITION INDICATOR SYSTEM

Henri G. Busignies, Forest Hills, N. Y., assignor to Federal Telephone and Radio Corporation, New York, N. Y., a corporation of Delaware Application January 26, 1946, Serial No. 643,701

16 Claims. (Cl. 343—6)

This invention relates to position indicator systems, and more particularly to radio beacon systems of the lighthouse type adapted to provide a display of aircraft in the vicinity of the beacon.

In my copending application, Serial No. 593,603, filed May 14, 1945, now Patent No. 2,513,282 granted July 4, 1950, there is described a position indicating system wherein a display of objects, such as planes, in the vicinity of a radio lighthouse station, is obtained not only in the lighthouse station but also in suitably equipped airplanes within said vicinity. The present application may be considered as an improvement and extension of the system therein described.

While in said application, the position of various objects, particularly planes in the vicinity of the lighthouse station, is indicated in suitable display, in accordance with the present invention, additional means is provided in the lighthouse station and in suitably equipped planes so that additional services may be performed. These additional services may include, for example, the transmission from the lighthouse station of a request for information such as for example, airplane identity or airplane altitude, or that the selected plane should establish two-way speech contact with the beacon station over some selected frequency, to which the airplane equipment will make suitable response without the need for verbal instructions via a speech channel.

In accordance with a feature of the present invention, it is recognized that these additional services do not involve rapidly changing quantities since for example, airplane identity is fixed and airplane altitude is a slowly changing quantity. Therefore it is not considered necessary or desirable that these items of information be transmitted continuously by all planes and be displayed automatically in some coded form on the cathode ray tube display which represents airplane positions, particularly the display at the lighthouse station. Such continuous display would require excessively complex equipment, probably more or wider frequency channels; and in addition, to exhibit, in addition to the positions, the altitudes and identities of a large number of planes on a necessarily two dimensional CRT screen, would be excessively confusing to the observer.

Hence, in accordance with a feature of the present invention, the additional services of for example, identification and altitude are performed from the lighthouse station by selectively "spotting" the plane whose identity or altitude for example, is sought, and by the automatic "responding" of the selected plane thereto.

An object of the present invention is the provision of an improved system for rendering certain informational and/or control services between two remote stations, such as for example, a radio lighthouse station and an airplane.

Another object is the provision of such a system in which the services are accomplished automatically without the intervention of personnel in one of said stations. More particularly, the crew of the airplane is not required to perform any function in relaying to the lighthouse station certain information such as identification, altitude, etc.

Another object is the provision of such a system in which the ground or lighthouse station may select any other station such as for example, an airplane, and cause the selected station automatically to respond with such information as identification, altitude, etc., as well as to indicate in the selected station, for example, that a certain voice channel is to be used for further information.

Another object is the provision of such service systems as are mentioned in the foregoing objects in conjunction with a position indicating system such as for example, that described in my aforesaid copending application.

In order that the foregoing and further objects and advantages of the present invention may be readily understood, it is desirable to present a general résumé of the system disclosed in my copending application. The major features of said system are as follows:

A. *Characteristics of system of my copending application.*

1. The system gives, essentially, a cathode ray tube display on each equipped airplane of the positions of all equipped planes within the service radius of the center lighthouse station, and of non-equipped airplanes, obstacles and rain clouds within a certain smaller radius. The particular spot on the cathode ray tube display, which represents the observer's own airplane, is distinctively indicated. Thus this system gives anti-collision and weather services.

2. A similar cathode ray tube display may also be obtained at any ground locations and particularly at the beacon station. This gives a valuable double check on traffic conditions so that in the case of faulty airplane equipment or negligent airplane personnel, warnings can be sent out over speech channels.

3. Because of the combination of 3PR type indications (see explanation in paragraph B hereinafter) with the RLS type indications (see paragraph B), certain valuable safety features, more fully described hereinafter, are obtained.

4. The airplane equipment is relatively simple and low powered and requires no directional or rotating antennae.
5. Although a radar type of service is rendered, the basic high power transmission takes place on the ground at the center lighthouse station. Also since these transmissions are synchronized, there is no interference between aircraft regardless of the number present.
6. By the use of systematically timed and shaped pulses, the various sub-functions of the system are performed with a minimum number of radio frequency channels, namely, one channel in the microwave band and one channel in the ultra high frequency band (see paragraph C hereinafter).

B. *The two major operations of the system.*— These two operations occur alternately and each of said major operations occurs once for each complete cycle of operation of the system. Each of these major operations requires, at most, several hundred to several thousand microseconds' time and a complete cycle, including the intervals required between successive operations to prevent interference between said operations, requires only a small fraction of a second.

1. *Three-path radar (3PR).*—This produces a position display of the relative positions of reradiating objects with respect to the radio lighthouse.
2. *Radio lighthouse display (RLS).*—This term is used to identify an operation in which reflected energy, not dependent upon specially repeated signals, is used for the purpose of producing a display indicating the position of planes, small clouds and other objects within the range of the lighthouse station. This operation does not depend on the use of repeaters or reradiation in said objects to reradiate energy, but instead operates on the reflection of energy from said objects.

C. *Only two carrier frequencies used.*—One of these frequencies is in the microwave range and is hereinafter referred to as F1 and the other of said frequencies is in the ultra high frequency range and is hereinafter referred to as F2. The different operations and functions of the system are performed with these two channels by using systematically timed and shared pulses, preferably pulses that are distinguished from each other in shape by their width.

D. *Pulses of the 3PR operation.*—In order to make the operation of the system clear, a list of the types of pulses 1 to 7 employed in both the major operations are herein listed and described. This list may be used as a reference in following the mode of operation of the system, as hereinafter described. These types of pulses are also consecutively herein numbered and this same numbering is maintained throughout the specification to identify these types of pulses. The pulses in the 3PR operation are:

1. *Microwave beam pulses 1, (F1, W1, beam).*— The matter in parentheses indicates that these pulses are radiated at a frequency F1, which is in the microwave range, and have an identifying pulse width W1. They are radiated in the form of a narrow beam emitted from the radio lighthouse which is sharply directive and is rotated at a relatively slow rate of speed such as for example, 50 R. P. M. Microwave beam pulses 1 serve to trigger suitable repeaters in properly equipped aircraft to cause said repeaters to reradiate pulses, more particularly, reradiated pulses 3 (see below).
2. *Sync. pulses 2, (F2, W2, omni.).*—Pulses 2 are emitted from the lighthouse with an identifying width W2 in an omni-directional pattern and at a frequency F2 which is preferably in the U. H. F. range. These sync. pulses 2 serve to start the sweep circuit in the planes for the cathode ray tube indicator therein. This function is performed by pulses 2 only in such planes as have suitable equipment for display purposes with systems of this type. Sync. pulses 2 also serve to condition the receiver in the plane so as to only receive response pulses 4 (see below). Sync. pulses 2 are emitted simultaneously with microwave beam pulses 1.
3. *Reradiated pulses 3 (F2, W1, omni.).*—Reradiated pulses 3 are reradiated from repeaters, such as suitable plane repeaters, in response to microwave beam pulses 1 when the beam reaches said repeaters. They are reradiated at a frequency F2 with a width W1 which may be the same width as the microwave beam pulses. They are radiated, as indicated, in an omni-directional pattern. The radiated pulses 3 which are produced in response to microwave beam pulses 1, serve a quasi-radar function. The reradiated pulses 3 are transmitted from the planes or other repeaters at a given time and produce response pulses 4 in the lighthouse. The time of arrival of the response pulses 4 from the lighthouse with respect to the time the reradiated pulses 3 are emitted from the plane, serves to indicate the distance of said plane from the lighthouse.
4. *Response pulses 4, (F1, W3, omni.).*—Response pulses 4 are transmitted from the lighthouse in an omni-directional pattern at a frequency F1 with a distinguishing width W3 in response to the reradiated pulses 3 from the repeaters. In the repeater station, such as for example, on an observer aircraft, the trace in a cathode ray tube starts moving in a linear path from the center position, aimed at the center of the cathode ray tube screen, from the moment the sync. pulse arrives. As this linear sweep starts, reradiated pulses 3 are transmitted from the plane and a short time thereafter the response pulses 4 from the lighthouse are received. The response pulses 4 are then used to turn on the beam so as to produce a spot of light, the deflection of the spot of light from the center indicating the distance of the plane from the lighthouse. If there are other properly equipped planes along the same azimuth from the lighthouse station as the one described above, these planes, like the plane hereinabove referred to, will also respond to the microwave beam pulses 1 and reradiate pulses 3, which in turn will produce response pulses 4 from the lighthouse. These successive response pulses from various planes in the same azimuth, which are struck simultaneously by the beam from the lighthouse station, will successively turn on the beam of the cathode ray tube in the observer plane, first mentioned, so that not only will the observer plane get an indication of its own distance from the lighthouse, but also an indication of other planes in the same azimuth therefrom.
5. *North sync. pulses 5 (F2, W5—very like W2— omni.).*—These pulses are emitted in place of sync. pulses 2 when the beam, emitted from the lighthouse, is pointing to the north and these sync. pulses 5 continue to be emitted for a period corresponding to the time required for said beam to move for example, through 1°. North sync. pulses 5 serve to synchronize rotation of the deflection coils of the cathode ray tube in the observer plane with rotation of the beam from the lighthouse station. This enables the observer plane to indicate the true azimuth of other objects around the lighthouse. As was stated hereinbefore, sync. pulses 2 serve to start a linear deflection of the cathode ray tube beam from the center of the screen in the observing airplane. The line along which this linear deflection occurs is rotated in synchronism with the rotation of the beam in the lighthouse so that the particular angle at which the indications appear on the screen, that is, the particular angle of this line of deflection, corresponds to the instant azimuthal direction of the lighthouse beam and therefore the indications on the screen of the cathode ray tube are produced not only to indicate the correct distance from the lighthouse but the correct azimuth therefrom. This will be more clear from the following example. Assuming at a given instance that the beam from the lighthouse is due east and there is a plane or two planes directly due east of the lighthouse. Assume further that the observing plane is not in said azimuth. At the instance when the beam from the lighthouse points due east, the microwave beam pulses 1 will trigger both of the planes due east of the lighthouse so that they reradiate successively pulses 3 which, in turn, causes the lighthouse to reradiate successively response pulses 4. Response pulses 4 are in an omni-directional pattern which is capable of being received by the observing plane even though it is not east of the lighthouse. At the instant when the beam in the lighthouse is pointing east, the beam in the cathode ray tube in the observer plane will have the rotating coils of said cathode ray tube rotated in a direction corresponding to the easterly direction of the lighthouse beam. Furthermore sync. pulses 2, which are omni-directional, will have started the sweep of the beam in the cathode ray tube moving from the center of the screen. Therefore when the response pulses 4, resulting from the reradiation of pulses 3 from the two airplanes due east of the lighthouse, are received by the observing plane, the indication produced will be at a distance from the center of the screen equal to the distance of the planes in the eastern azimuth from the lighthouse and at an angle on the screen from the center thereof corresponding to the easterly azimuth.

E. *Pulses of the RLS operation.*

1. *Microwave beam pulses 1 (F1, W1, beam).*— These are similar to pulses 1 in the 3PR operation. They serve to trigger active repeaters in planes so as to produce reradiated pulses 3 and they also serve to produce reflections from said active repeaters as well as from objects which are not repeaters to thereby produce reflected pulses 7.
2. *Special sync. pulses 6 (F2, W4, omni.).*—The special width W4 of these pulses 6 serves to distinguish them from the pulses 2 of the 3PR operation. Special sync. pulses 6 also start the sweep in the receivers but unlike sync. pulses 2, special sync. pulses 6 leave the circuit of the receiver open for the reception of reradiated and reflected pulses. Special sync. pulses 6 are emitted from the lighthouse station at the same time as microwave beam pulses 1.
3. *Reradiated pulses 3 (F2, W1, omni.).*—Planes that have active repeaters respond to microwave beam pulses 1 by emitting reradiated pulses 3. It is to be noted in this list that no response pulses 4 are part of the RLS operation. The receiver in the lighthouse is blocked with respect to reradiated pulses 3 during the RLS operation so that the reradiated pulses 3 do not trigger the lighthouse to emit response pulses 4.
4. *Reflected pulses 7 (F1, W1, reflected).*—Microwave beam pulses 1 are reflected from various objects such as hills, mountains, planes without active repeaters as well as planes with active repeaters. Reflected pulses 7 and reradiated pulses 3, which latter come only from planes with active repeaters, are received by an observer plane and their position is indicated on the cathode ray tube indicator of the observer plane. In order to produce a correct indication of the position of various objects on the cathode ray tube screen of the observer plane, two parameters must be known: the azimuth of the observed object and its distance from the lighthouse. The azimuth of the object with respect to the lighthouse is properly indicated without any difficulty since the microwave beam must be directed at the object at a given instant in order that reflections or reradiations from the object are to be produced. Since the deflecting coil of the cathode ray tube in the observer's plane is synchronized to rotate with the beam from the lighthouse (by north sync. pulses 5), it will be seen that the line along which the beam in the cathode ray tube is deflected corresponds with the azimuth toward which the beam of the lighthouse points. The distance of the object from the lighthouse, however, involves a solution of a triangle whose three sides are as follows: one side is a line drawn from the lighthouse to the object. The second side is a line drawn from the object to the observing plane and the third side is a line drawn from the observing plane to the lighthouse. This will be explained in greater detail hereinafter in connection with Fig. 1. For the present purposes, it is sufficient to understand that in order to solve the triangle, the position of the observing plane must also be known. The position of the observing plane is determined in a self-position operation hereinafter described.

F. *Self-position determination.*—For the purposes of determining the position of the observer plane so as to be enabled to indicate thereon the position of various objects as a result of the RLS operation, or with respect to the lighthouse, use is made of the interval of time during which the beam from the lighthouse is directed at the observer plane. The two parameters essential in knowing the self-position, or position of the observer plane, are azimuth with respect to the lighthouse and distance therefrom.

1. *Self-azimuth determination.*—When the beam from the lighthouse sweeps over the observer plane, the microwave beam pulses 1 in both of 3PR operation and the RLS operation are used to synchronize the rotation of an element in a cubic law sweep-curving circuit (more fully described hereinafter). This synchronization occurs not when the beam from the lighthouse is pointing due north but rather when the beam is pointing or sweeping over the observer plane. This injects into the cubic law sweep-curving circuit a factor dependent upon the self-azimuth or azimuth of the observer plane.

2. *Self-distance determination.*—This is accomplished through a notch follow-up unit hereinafter more fully described. This unit only operates when the beam from the lighthouse is sweeping over the observer plane, and only during the 3PR operation of each cycle. At such time the microwave beam pulses 1 strike the observer plane and all other planes in the same azimuth. The observer plane and said other planes respond with reradiated pulses 3 and the lighthouse then responds with response pulses 4. Response pulses 4 are picked up by the observer plane and by means of a notch follow-up circuit, the particular pulse corresponding to the position of the observer plane (that is the response pulse 4 which was emitted in response to the reradiation pulse 3 from the observer plane) is then selected by the notch follow-up unit and is followed. The initial selection by the notch follow-up unit is accomplished by manual adjustment of said unit. Thereafter the notch follow-up unit follows the variations in position of the observer plane as long as it is in the vicinity of the lighthouse. The position of the plane, that is its distance from the lighthouse, is injected from the notch follow-up unit into the hereinabove-mentioned cubic law sweep-curving circuit and controls the sweep of the beam in the cathode ray tube in a manner hereinafter described so as to produce an accurate indication of the distance of the objects which are being indicated by RLS operation on the cathode ray tube. This self-distance factor and self-azimuth factor, or more inclusively the entire self position operation, is checked every time the beam from the lighthouse passes over the observer plane.

The foregoing résumé gives a generalized picture of the system described in my aforesaid copending application. In accordance with a feature of the present invention, the additional services, such as identification and altitude of planes, are to be performed by means of a relatively simple addition to the transmitter or lighthouse station and in the airplane equipment, without changing the mode of operation of the position indicating system thus described and with very few changes in the equipment already described in said copending application.

Accordingly, a further object of the present invention is the provision, in a position indicating system of the type hereinabove described, in which additional services such as for example, identification and altitude indication, are performed without using any additional frequencies beyond the two required for the 3PR operation and only by the use of some additional pulses located between those already required and without the use of any additional receivers, transmitters or antennae on the airplane.

A still further object is the provision of the means set forth in the foregoing paragraph in which the additional services are performed between a plane which is selectively spotted and which plane is adapted to automatically respond.

In accordance with a feature of the present invention a special ground operator or "spotter" at the lighthouse station, views a cathode ray tube display of all airplanes. Wherever directed to do so or at certain prescribed routine intervals, he causes the radiation of special coded command pulses, to take place without the use of any speech channel, but over the existing ultra high frequency ground transmitter, that is, at a frequency F2. These coded command signals have such characteristics that they will affect only the selected "spotted" airplane. The spotter may, by push-button selection, "command" that the spotted airplane will respond with identity and altitude information automatically (possibly also air speed, heading, and other information). Each airplane will have cooperating equipment which, without the intervention of any airplane personnel, will respond (only to coded command pulses addressed to it) with "coded response" pulses carrying the requested information. These will be picked up and decoded by the lighthouse station. In this manner the lighthouse station spotter then "questions" a large number of airplanes individually, sequentially and in a short time.

The spotter may also, by push-button selection, cause a visual indication to appear in the spotted airplane, which informs the member of the aircraft personnel, who attends to the radio equipment, to set his microwave speech equipment to a certain selected channel say one of fifty. The ensuing two-way speech contact between airplane and control tower may take place without further attention on the part of the spotter or tie-up of his facilities.

Other and further objects of the present invention will become apparent and the invention will be best understood from the following description of an embodiment thereof, reference being had to the drawings, in which:

Fig. 2 is a block circuit diagram of the equipment at the radio lighthouse station with the portions in dark lines indicating the additions thereto in accordance with the present invention;

Fig. 3 is a block circuit diagram illustrating a repeating display receiver, such as for example, is found on an observer airplane, with the portions thereof in darker lines showing the additions in accordance with my present invention;

Fig. 6 is a circuit diagram of a cubic-law sweep-curving circuit for use in the system of Fig. 3;

Fig. 7 is a pulse width selector which may be used in the circuit of Figs. 2 and 3;

Fig. 8 is a graphical representation serving to explain the operation of the system of Fig. 7;

Fig. 11 is a block diagram of one form of command coder employed in the equipment of Fig. 2;

Fig. 12 is a representation of the coded pulses transmitted from the lighthouse and received in the equipment of Fig. 3, showing their time relationship to a reference pulse derived from the notch follow-up unit;

Fig. 13 is a block diagram of one form of decoder and indicator associated therewith that may be employed in the equipment illustrated in Fig. 3;

Fig. 14 is a block diagram of one form of an arrangement including the coded response pulse generator, barometric control and identification modulator illustrated in Fig. 3.

In order that the portions of the following system, which are made in accordance with the present invention, be distinguished from the portions thereof which are described in my aforesaid copending application, the following description will be divided into two parts, Part I will describe the system of the aforesaid application and Part II will describe the additions and changes therein in accordance with the present invention.

PART I

*The system of the aforesaid copending application*

Figure 1:
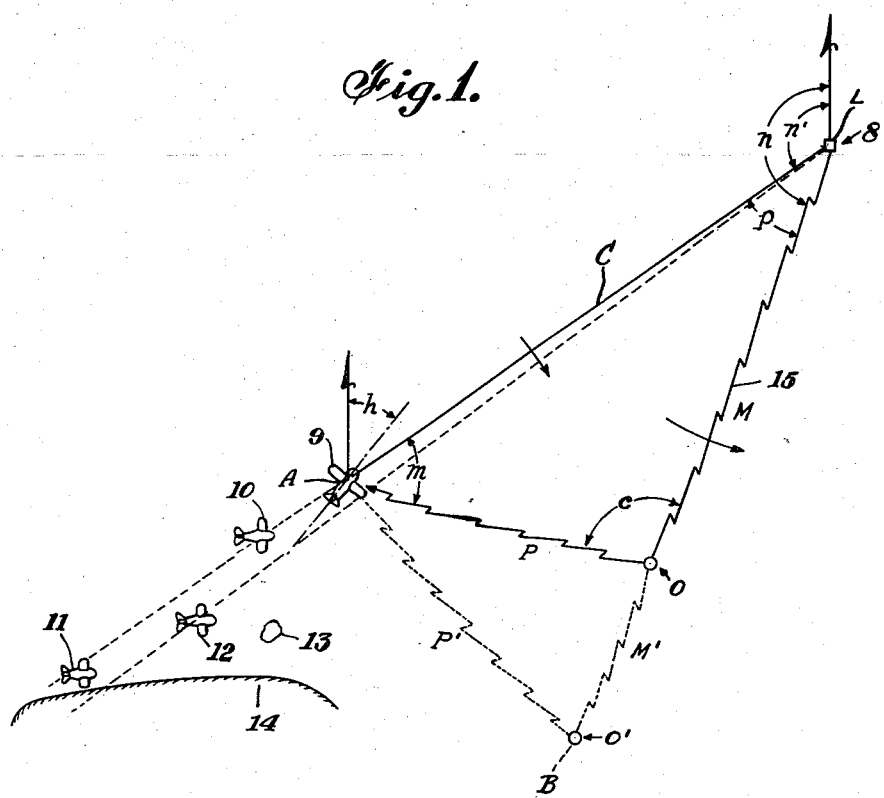
Fig. 1 is a diagrammatic illustration, showing the relative position of a radio beacon lighthouse, several repeating objects, such as for example, airplanes equipped with suitable repeaters, and a display or observer repeater unit such as for example, an observer plane, used in describing my present invention and its relation to the invention described in my aforementioned copending application.

Referring now to Fig. 1, the scene there represented depicts a radio lighthouse 8, having along one azimuth therefrom, an observer plane 9 and two other planes 10 and 11 each at progressively greater distances from the lighthouse, and along a slightly different azimuth from lighthouse 8 is another plane 12. A small cloud 13 is at another azimuth and a mountain 14 is behind the planes and cloud. At points O and O' are two other objects at an entirely different azimuth, these objects being used in a subsequent discussion and serving either to reradiate or reflect energy from the lighthouse as will be pointed out hereinafter. Energy from the lighthouse is sent out in the form of a narrow beam 15 (shown in a jagged line) of microwave beam pulses 1. The beam 15 rotates slowly around the lighthouse 8 in a counter-clockwise direction at about 50 R. P. M.

Referring now to Fig. 2, the lighthouse equipment 16, there illustrated, includes a cycle control circuit 17 which delivers control signals selectively over leads 18—24 to control the operation of various parts of the circuit. Control circuit 17 may be some form of cyclic switching circuit preferably under control of motor 25 which serves also to rotate beam 15. At the start of each typical 3PR operation, except in the north position, control signals are delivered over leads 18, 19, 20 and 24. The control signal over lead 18, from circuit 17, triggers the W1 width pulse modulator 26 of microwave transmitter 27, thus causing this transmitter to send out a high power microwave pulse 1 of width W1 (e. g. 1½ microseconds) and frequency F1. The control signal over lead 19 conditions the electronic switch 28 for routing this pulse to the beam radiator 29 and a powerful microwave pulse 1 is radiated in a narrow beam 15.

At the same time that this microwave beam pulse 1 is emitted from radiator 29 as above traced, the control signal over lead 20 triggers W2 width modulator 30 and causes transmitter 31 to deliver a synchronizing pulse 2 of width W2 of lower frequency (F2) U. H. F. carrier which is omnidirectionally radiated by antenna 32. The width of this pulse serves to characterize the operation as a 3PR operation.

In the equipment 33 of Fig. 3 on the observer's airplane, the microwave pulse 1 (which is assumed for the moment to miss this airplane as the beam 15 is pointing along another azimuth) is not received, but the 3PR synchronizing signal of lower frequency is picked up by antenna 34 and thence transmitted through coupler 35 to U. H. F. receiver 36. From the output of this receiver 36, this 3PR synchronizing pulse 2 passes through width selector 37 to start linear sweep circuit 38 and control signal timer 39. Incidentally, this signal also is applied to combining circuit 40, through coupler 41, and thence to the control grid 42, of oscilloscope 43, so as to cause a bright spot, but this is of no consequence since the beam has not yet started to move away from the center of the screen.

The signal applied to sweep circuit 38 causes generation of a linear sweep which passes through coupler 44 and combining circuit 45 to the deflection coil 46 of the oscilloscope 43, thus causing the beam to move linearly outward.

The signal applied to the control timer 39 causes the latter to deliver a number of blocking and gating signals which condition the circuit for 3PR type of operation as follows: Firstly, the blocking signal applied over line 47 to couplers 41 and 48 prevents this combining circuit 40 from passing during for example, the next 800 microseconds, any signals other than the special response pulses 4 of width W3, F1, characteristic of the 3PR operation, applied over coupler 49. Secondly, the signal applied over line 50 to gate 51 prepares this gate to be opened by a maximum strength microwave pulse 1 such as would be produced if the beam were pointed at the airplane; since that is assumed to be not the case during the present moment, this signal applied to gate 51 is of no consequence. Thirdly, the blocking signal applied from timer 39 over line 52 to input coupler 53 of combining circuit 45, blocks the latter insofar as input from line 52 is concerned so that only the linear sweep waves from sweep circuit 38 can pass through this combining circuit to the deflection coils 46.

Thus, in response to the synchronizing pulses 2 (F2, W2), the airplane receiving equipment merely commences a linear outward sweep of the oscilloscope beam and conditions itself to ignore all subsequent signals excepting response pulses 4 from the lighthouse which are relied upon for the 3PR function.

Referring now to Fig. 1, it will be noted that if the beam 15 is directed toward plane 12 the high power microwave beam pulse 1 strikes first the airplane 12 and next the mountain 14. The reflections which take place from the mountain are of no effect because the receiving equipment is conditioned by sync. pulse 2 to display only the response pulses 4. Airplane 12, however, will respond to the microwave beamed pulse 1 in the following manner (for the moment, the diagram of Fig. 4 may be considered as representing the equipment carried on airplane 12).

The circuits of the receiving equipment of airplane 12 receive both the microwave beam pulse 1 and the 3PR synchronizing pulse 2 substantially simultaneously: The sync. pulse 2 produces all the same effects above traced. In addition the microwave beam pulse 1 from the lighthouse is now picked up by antenna 54 and is received by receiver 55 from which it passes through the W1 width selector 56 and over line 57 to trigger the U. H. F. transmitter (F2) 58, thus producing a reradiated pulse 3 (F2, W1). It should be noted that the transmitter 58 requires a large voltage for triggering and, therefore, cannot be triggered by any but the direct pulse from the lighthouse which will be several thousand times higher in energy than the corresponding reflected pulses 7 (F1, W1, reflected). The signal from microwave receiver 55 will also pass through the maximum signal selector circuit 59 to perform certain functions, but these will not be considered at this time since they do not have any relation to the response sent out by the airplane.

While the foregoing steps indicate what is occurring in the equipment of airplane 12 when the beam 15 is aimed directly at it, the corresponding action of the observer's plane 9 at that moment when the beam is directed at plane 12, will be described hereinafter.

Referring now to Fig. 1, it will be seen that the response of the airplane 12 returns to the lighthouse 8, and there causes the emission of a response pulse 4 (F1, W3). The corresponding action takes place as follows, in the diagram of Fig. 2. The arriving reradiated pulse 3 (F2, W1, omni.) is picked up by antenna 60 and received by receiver 61 from which it is transmitted not only to a suitable ground display equipment 62, but also to the special width W3 pulse modulator 63, of transmitter 27. As a result, this transmitter 27 sends out a response pulse 4 (F1, W3, omni.) of special width, e. g. 2 microseconds. This pulse passes through the electronic switch 28, now in normal condition, to the circular pattern radiator 64 so as to travel outward in all directions. It is to be understood that the receiver 61, which was momentarily blocked over line 24 when sync. pulse 2 was emitted by the lighthouse equipment, became unblocked immediately thereafter.

In the receiving equipment of the observer airplane 9 (see Fig. 3 which may now be considered as the equipment of said plane) this response pulse 4 is picked up by antenna 54, received in receiver 55 and delivered through the W3 width selector 65 and coupler 49 to the combining circuit 40. Although this circuit 40 is blocked in respect to its other inputs 41, 48, it is not blocked in respect to its input 49 and therefore forwards the signal to the intensity controlling grid 42 of oscilloscope 43. Accordingly, a bright spot is produced on the screen of this oscilloscope to represent the position of the airplane 12, as reported by the lighthouse 8.

Since the deflection coil 46 of this oscilloscope was energized by a linear sweep from sweep circuit 38 at the instant of arrival of the 3PR synchronizing pulse 2, the amount of radial deflection of this beam will, at this instant, correspond to the time delay between the arrival of such 3PR synchronizing pulse 2 and the arrival of the response signal 4. This time delay will be proportionate to the radial distance of the airplane 12 from the lighthouse and therefore the spot now produced on the oscilloscope of the observer's airplane 9 will be correct with respect to the amount of radial deflection. With respect to the azimuthal correctness of this spot, the rotation of coil 46 is made substantially in synchronism with the rotation of the lighthouse beam so as to show this spot in the correct angular direction.

The manner of insuring such synchronism will be described later.

The 3PR operation is now essentially completed. After the end of an 800 microsecond interval, the timer 39 will remove the several blocking and gating signals which have temporarily conditioned the equipment for this form of operation, and the receiver will be ready to commence an RLS operation.

Before discussing the RLS operation of the system disclosed, a survey of the principle of said system is best made.

Briefly, the principle of the radio light-house system (RLS) type of operation is the same as the priniple of operation of conventional radars except that the transmitter is widely separated from the receiver and therefore, parallex correcting means are required to eliminate the distortions resulting from such separation or offsetting of these two portions of the system, and calculation or determination of the distance must be made.

In the RLS operation of the present invention, the same general principles are used. In this case, however, the transmitter and its sharply beamed slowly rotating antenna are located on the ground, while the receiver with its omnidirectional receiving antenna is located on an airplane which may be several miles away.

There is no great difficulty in determining the direction of the obstacles whose reflections are being received at any given time. Referring to Fig. 1, if the beam 15 of lighthouse 8 is pointing south-southwest at the moment under consideration, it is clear that all the obstacles "illuminated" by such transmitter must be in a straight line extending south-southwest from the transmitting point. Therefore, the deflection coil of the indicating oscilloscope in the airplane can be turned so that at this instant it will deflect the oscilloscope beam radially in the direction representing south-southwest. Since the deflecting coil of the oscilloscope is located in the airplane and the rotating beam is on the ground, some synchronizing means is necessary to orient this coil in the same direction as the beam, but such synchronizing means are comparatively simple and reliable.

In order to explain how the correct distance can be determined in spite of the offset between the transmitter and the receiver, reference may be made to Fig. 1. The point L represents the rotary lighthouse 8, the points O and O' represent reflecting objects or other reradiating objects, while the point A represents the airplane 9 which carries the receiving equipment for providing the RLS display now under consideration. The jagged line extending south-southwest from the lighthouse represents the narrow beamed radiation 15 from the lighthouse to the object O and the length of this path from L to O (or O') is denoted by M (or by M'). The jagged line from O to A represents the reflected energy travelling from the object to the airplane and the length of this line from O (or from O') to A is denoted by P (or by P'). The airplane A (9) is assumed to be 9 miles southwest of the lighthouse L, and the solid line C represents this distance, i. e., the offset distance between the two parts of the radar.

Consider now one partiular pulse 1 of energy radiated south-southwest from the lighthouse toward objects O and O' and reflected from these objects to the airplane 9. It is clear that the pulse will first arrive at object O and then will later reach the other object O'. The total time required for the pulse to travel from L to O and thence to A, will be proportional to the sum of the distances $M+P$; and in the same way the total time between the radiation of the pulse from L and the arrival at A of the pulse reflected from O' will be proportional to $M'+P'$. It is, therefore, clear that the pulses from the two objects will not arrive at the airplane 9 at the same time, but wil arrive sequentially. It is also clear that if the airplane 9 is anywhere except directly on the line LO' extended (i. e., anywhere except at a point such as B), the pulse reflected from O will always arrive first and the pulse from O' second, just as in a normal radar. The only difference is that the lengths of the delays are not exactly proportional to the distances from L to the objects and, therefore, if a linear sweep were used on the oscilloscope, the distances would be distorted. To overcome this, it is necessary to make the sweep circuit non-linear so that it starts moving from the center of the screen very rapidly and then travels slower and slower in accordance with a certain cubic law.

At the particular moment illustrated in Fig. 1, the beam from L to the two objects is assumed to be aimed south-southwest so that the angle $n$ is 157½ degrees. The plane is shown 35½ degrees south of west from the lighthouse so that the angle $n'$ is 125½ degrees. Thus, the angle $p$ (which is the difference between $n$ and $n'$) is 32 degrees. The distance C between the airplane and the lighthouse is assumed to be 9 miles.

For these particular values of angle $p$ and distance C, the length of the indirect path $M+P$ is about 11.8 miles (assuming that 0 is 7 miles from L) and, therefore, the pulse travelling from the lighthouse to O and thence to the airplane 9 will have to travel 11.8 miles. For synchronizing purposes, a sync. pulse 2 is simultaneously sent directly from the lighthouse to the airplane along path C. Since this direct pulse 2 travels only 9 miles while the indirect reflected pulse travels 11.8 miles, the difference in the path lengths of these two pulses will be about 2.8 miles. Taking the velocity of propagation of all the pulses as .186 mile per microsecond, the airplane will observe a delay of about 15 microseconds between the arrival of the direct pulse from the lighthouse, and the arrival of the indirect pulse reflected from object C.

In order to correctly represent the fact that object O is 7 miles from the lighthouse, the sweep voltage which deflects the beam of the oscilloscope in the airplane should, therefore, have such speed that in 15 microseconds it deflects the beam to a distance corresponding to 7 miles (i. e., 7/3 inches if the desired scale is 3 inches per mile).

For another object such as O', however, (whose distance M is assumed to be 10 miles) the sum of the paths $M+P$ will be equal to about 15.3 miles or 6.3 miles longer than the path of the direct pulse. Thus, the delay time for the pulses reflected from O' will be 34 microseconds, or more than twice as great as the delay time for the pulses reflected from O. For correct indication of object O' the sweep circuit must, therefore, produce a deflection corresponding to 10 miles (i. e., 10/3 inches deflection) in a time of 34 microseconds.

Comparing this latter requirement with the previous requirement, it is seen that in the first 15 microseconds, the beam must move 7/3 inches while in a total of only 34 microseconds, it must product a deflection of only 10/3 inches. Thus, it must travel more than two inches during the first 15 microseconds and only one inch during the next 19 microseconds. It it is assumed that 10 volts must be applied to the oscilloscope for producing ⅓ inch deflection (i. e., for representing one mile of distance), the sweep voltage required must rise from zero to a value of 70 volts in the first 15 microseconds and must then rise more slowly from 70 to 100 volts in the next 19 microseconds.

It is clear that as the beam of the lighthouse rotates farther around so as to increase the angle $p$ to some value greater than the 32 degrees heretofore assumed, the same kind of action above described will take place with respect to the new series of objects which are now in line with the beam. Similarly, for all other values of the angle $p$, a correspondingly different curve of the sweep circuit is required.

Not only do these curves vary as the angle $p$ changes, but they also vary for different values of the distance C. Thus, if the distance C from the lighthouse to the airplane is assumed to be three miles instead of 9 miles, a different family of curves will apply.

Although the curves vary in a seemingly complicated manner with variations of $p$ and also change in scale with variations in C it turns out that they can practically be produced by adding together two very simple curves as more fully explained hereafter.

The method of producing the RLS display thus boils down to two steps:

1. Rotating the deflection coil of the oscilloscope in synchronism with the rotation of the lighthouse beam on the ground by means of any simple synchronizing arrangement.
2. Producing a non-linear sweep which travels rapidly at first and then more slowly.

The shapes of these curves and, therefore, the speed of travel of the sweeps must be varied for different values of the angle $p$ and the distance C. Thus, in order to obtain a correct indication, it is necessary for the airplane to know its own distance from the lighthouse, as well as its own relative azimuth angle from the lighthouse measured with respect to the direction of the lighthouse beam at that moment). This relative azimuth angle $p$ is readily found, if the beam is rotating uniformly, by observing the instants when the beam sweeps past the airplane itself and synchronizing a shaft therewith. The distance C is determined by another mechanism of more or less conventional form hereafter described.

The need for actually knowing the airplane's own position with respect to the lighthouse in order to get a correct RLS indication may at first appear as a disadvantage. Actually, however, this is one of the extremely important advantages of the invention, since this makes it possible to check the accuracy of the airplane's own position indication in fool-proof manner, merely by noting whether the various fixed objects shown on the oscilloscope screen correspond in shape and relative position to the same objects printed on a map. If any error occurs in the self-position finding equipment which determines the airplane's own radial distance or relative azimuth with respect to the lighthouse, a corresponding distortion of the RLS indications will result, so that the natural obstacles and active and passive repeaters will no longer form a picture corresponding to that printed on a map of the terrain. In fact, no conceivable error or series of errors occurring in the mechanism could conceivably result in displaying a correctly shaped indication of the terrain if these determinations of the self-position of the airplane were incorrect.

Although the basic two functions performed by the proposed system consist of the 3PR and the RLS functions, such as performed by a three path radar and a rotary lighthouse system respectively, it has already been pointed out that for properly producing the RLS display, the airplane equipment requires a knowledge of the airplane's own distance and azimuth with respect to the lighthouse. The determination of these two factors may be made in a great many different ways but the preferred manner of accomplishing this is as follows:

The airplane's own azimuth is determined by noting the time elapsed between the instant when the lighthouse transmits a special north sync. pulse 5 (F2, W5) signifying that its beam is then passing through north or some other fixed reference direction and the somewhat later time when the rotating lighthouse beam 15 sweeps past the airplane. The airplane's distance is determined by a simple notch follow-up mechanism or self-adjusting double-gate device which acts, in well known manner, to constantly align itself with a previously selected pulse which is characterized by a particular time delay with respect to the reference pulse.

It is most convenient to apply this notch follow-up principle to the response pulses 4 (F1, W3, omni) which are emitted by the lighthouse in conjunction with the 3PR operation of the system since the time-distance relationship is linear for these pulses. It is well known that notch follow-up devices do not operate as reliably when fed with a very large number of pulses. Accordingly, the only pulses which should be delivered to the notch follow-up device are the response pulses 4 received from the lighthouse at those instants when the lighthouse beam is aligned with the observer's own airplane. All other types of pulses, and all the similar response pulses emitted during other times when the lighthouse beam is not directed at the observer plane 9 are screened out before application to the notch follow-up unit.

Ordinarily, the result will be that only the pulses representing the position of the observer's own airplane will be delivered to the notch follow-up unit, since there will not usually be two airplanes lying within plus or minus half a degree from the exact azimuth angle of the observer's own airplane, unless there are more than 360 airplanes surrounding the field at one time. In order to illustrate the most disadvantageous conditions, however, Fig. 1 has been drawn on the assumption that three different airplanes 9, 10 and 11 are simultaneously flying at the same azimuth angle. Under these conditions, three separate response pulses 4 will be applied to the notch circuit in each RLS cycle that occurs while the beam 15 is over plane 9. Even under such conditions, the notch follow-up mechanism will almost always correctly follow the pulse upon which it is already set. Thus, if the airplane is the only one flying at its particular azimuth angle at the moment when it enters the effective field of the lighthouse, its notch which then receives only the pulses corresponding to its own position, will correctly adjust itself to such pulses and will thereafter follow these even during intervals when several other planes are occupying the same azimuth.

Any notch follow-up device is theoretically subject to the possibility of shifting its tracking so as to follow an undesired airplane if such airplane happens to fly exactly above or below the intended airplane so as to coincide simultaneously in both azimuth and distance. For the sake of economy and simplicity, moreover, it is contemplated to employ a comparatively simple form of notch follow-up device in the proposed system and, therefore, it is expected that this notch follow-up device will be subject to the above described change of tracking whenever some other airplane flies within approximately one-half degree of the exact azimuth of the observer's own plane and simultaneously within a certain critical distance zone extending from the observer's plane to 480 yards further out.

More important than the frequency of occurrence of mistracking is the question of its seriousness. In the system of the present invention, the occurrence of a mistracking of the notch follow-up device will constitute only an annoyance but not a hazard. In the first place, the pilot will see the representation of his airplane coming gradually closer to one of the other spots on the screen until they merge. At this time, no error has yet arisen. When the merged spot again divides so as to appear as two spots which gradually diverge, the pilot will be fully aware that there is a possibility of a wrong indication. If the divergence of the two spots occurs in such a way as to result in different azimuths, the error, if any, will be immediately corrected. If the planes separate only in respect to their radial distances, and if the notch follows the wrong one of the two airplanes, this will be immediately shown by a progressively increasing distortion of this RLS display. The reason for this is that the RLS display depends for its correct shape on the correct position of the notch follow-up device as previously mentioned.

Whenever an incorrect tracking of the notch follow-up mechanism is thus observed, the pilot can manually return the notch to its proper tracking by adjusting the system until the map assumes a correct form which can readily be observed by comparing it with the undistorted 3PR display shown on the same screen.

It is thus clear that the question of possible mistracking of the notch is primarily one of convenience and not a question of basic misinformation. In fact the system may be operated without any notch device at all, by arranging for the pilot manually to set the distance factor into the system each time he desired to read the RLS display.

To summarize the operation of the sub-cycle for the radio lighthouse system, microwave beam pulses 1 are transmitted from the lighthouse 8 in the form of a sharp beam 15. This transmitted energy then may be reflected from the various reflecting objects for reception on the various craft. Simultaneously with the transmission of the energy in beam 15 special sync. pulses 6 are transmitted for the purpose of initiating the sweep circuit on the separate indicating receivers. This pulse operates to produce a linear sweep for the indicator. Microwave beam pulses 1 also are repeated by each of the planes carrying the repeaters and these reradiated repeated pulses 2 are received on other planes to produce indications of the position of these planes. Thus, on the indicating receiver, for example on plane 9, there will be received the special synchronizing pulses 6 starting the sweep circuit and the reflected pulses 7 (F1, W1, reflected) as well as the reradiated pulses 3 from other craft. These reflected and otherwise reradiated pulses will be timed in accordance with the space position of these objects relative to the sweep circuit so that their position on an indicator will be clearly set forth.

The foregoing operation is accomplished, referring now to Figs. 2 and 3, in the following manner:

The cycle control circuit 17, Fig. 2, delivers control signals over leads 18, 19, 22 and 23 at the start of each typical RLS operation. As before, the control signals on leads 18 and 19 cause the emission of a powerful microwave beam pulse 1 from radiator 29. The control signal over lead 22 also causes the simultaneous radiation in all directions from antenna 32 of a special synchronizing pulse 6, for in this case it is the RLS width modulator 66 of transmitter 31 which performs the triggering and therefore the pulse is of such width W4 as to signify the commencement of an RLS type of cycle. The control signal applied to lead 23 serves to block U. H. F. receiver 61 for 800 microseconds, so as to prevent the emission from the lighthouse of the response pulses 4 which are required only in the 3PR cycles.

In the receiver of the observer's airplane 9, the special RLS synchronizing pulse 6 is received by receiver 36 as in the previous case, but this time passes through width selector 67 instead of 37 since it has a width characteristic W4 of the RLS cycle. The output of width selector 67 starts the linear sweep circuit 38 in the same way as in the prior case but does not energize control timer 39. Accordingly, no part of combining circuit 40 nor of combining circuit 45 is blocked. Also, the gate 51 is not prepared for possible operation.

When the linear sweep circuit 38 commences to deliver a saw-tooth voltage to the combining circuit 45, it simultaneously delivers a similar voltage to the cubic-law sweep-curving circuit 68 and accordingly, the latter commences to deliver a suitable correcting voltage of curved characteristics which will be considered in greater detail later. This curved voltage output of circuit 68 is of such a form that when it is added to the saw-tooth sweep from circuit 38, with proper restoration of the D. C. axis so as to insure the sum of the two voltages is never negative, the resultant wave will be suitable for the sweep required in the RLS operation. Accordingly, the output of combining and D. C. restoring circuit 45 is applied to the deflection coil 46.

Referring now to Fig. 1 it will be now assumed for the moment that the beam 15 representing the powerful microwave pulse 1 travels outward so as to strike both the airplane 12 and the mountain 14. The airplane 12 responds as before when struck by this beam, and as before, the mountain reflects some of the microwave pulse 1 striking it. Thus, a reflected microwave pulse 7 and a lower frequency U. H. F. reradiated pulse 3 are transmitted in all directions from the airplane and mountain, respectively, so as to be received by all other airplanes in the vicinity.

Since the airplane 12 is closer to the lighthouse 8 than mountain 14, its reradiated pulse 3 will reach the observer's airplane 9 earlier than the reflected microwave pulse 7 of the mountain. The reception of these pulses will, therefore, be considered in corresponding order.

When the reradiated pulse 3 from airplane 12 arrives at the observer's own airplane 9, it is picked up by antenna 34 and transmitted through coupler 35 to receiver 36 from which it passes to input coupler 41 of combining circuit 40 and thence to the intensity control grid 42 of the oscilloscope 43. Since the proper sweep voltage has been applied to the deflection coil 46, the radial deflection of the beam at this instant will be correct for representing the distance of the airplane 12 from the lighthouse 8. The deflection coil 46 rotating in proper synchronism with the lighthouse beam will assure correct azimuth indication. Thus, a spot shown on the oscilloscope will correctly represent the airplane 12 both in azimuth and radial distance.

A short time later, the reflected microwave pulse 7 (F1, W1, reflected) from the mountain 14 will arrive at the plane 9. This will be picked up by antenna 54, received in receiver 55 and delivered through width selector 56 to input coupler 48 of the combining circuit 40. Since no part of this combining circuit is now blocked, this pulse (F1, W1, reflected) will pass through to the intensity-control electrode 42 of oscilloscope 43. As in the case of the reradiated pulse 3 from airplane 12, this pulse will also produce an indication which is correct in both distance and azimuth but which will generally be of somewhat lower intensity. By providing a separate volume control in the input couplers of circuit 40, signal representations of natural objects and passive repeaters may be adjusted to any desired brilliance, independent of the brilliance employed for the display of active repeaters and other airplanes by the RLS principle and also independent of the brilliance employed for the 3PR display.

In the foregoing description the 3PR and RLS operation was traced without explaining in detail all the features. For example, the synchronous rotation of coil 46 was assumed. How this synchronism may be accomplished will now be described.

Referring to Fig. 1, it will be seen that when the beam of the lighthouse is sweeping through north, the successive cycles of this lighthouse are performed as usual, except that the regular 3PR synchronizing signal ordinarily transmitted at the start of each 3PR operation is temporarily replaced by a slightly modified signal for characterizing the north orientation of the beam.

This special north synchronizing signal or pulse 5 may be of a width W5 only slightly different from width W2 so it will pass through the width selector 37 of the receiving equipment, so that the 3PR cycle takes place in the same manner as usual. This special north sync. pulse 5, however, will also pass through width selector 69 so as to energize start-stop clutch 70 over line 71. Width selector 69 is made more selective than selector 37 so that sync. pulses 2 of width W2 will not be passed.

An accurate speed motor 72 with suitable gear reduction and speed control drives the input shaft 73 of clutch 70 at a speed very slightly faster than the beam rotation which has been chosen for illustration as 50 R. P. M. When the system is first put in operation, the motor will turn the input shaft 73 of clutch 70 but the output shaft 74 will not be able to rotate until this clutch is tripped by an electric impulse. The next time the lighthouse beam 8 swings through north, the clutch will be tripped so as to permit the output shaft to make one rotation. Since the lighthouse beam is assumed to rotate at exactly 50 R. P. M., while the motor turns slightly above this speed, the output shaft or start-stop clutch will complete its cycle a few milliseconds before the beam of the lighthouse again reaches north and will pause for a correspondingly brief interval before it is again released to commence a new cycle. Thus, the output shaft 74 of clutch 70 rotates in substantial synchronism with the lighthouse beam and its angular position at every instant closely corresponds to that of the lighthouse beam.

In the particular arrangement illustrated, the output shaft 74 of clutch 70 is directly connected to magnetic deflection coil 46 so that a "fixed map" form of display will be produced, with the north direction on the scope in a fixed position with respect to the screen, e. g. always at the top of the screen. This form of indication has the advantage of being consistent with the fixed central representation of the lighthouse, which results naturally from the simple forms of 3PR and RLS displays. In order to show the heading of the plane, as well as its position on such "fixed map" display, a heading indicator dial 75 is provided. This may take the form of a transparent disc with a large number of arrows engraved lightly on its surface. This heading indicator dial 150 is rotated by a compass repeater 76 controlled by some sort of compass.

It is clear that a "self-orienting-map" form of display may be given if preferred by providing a differential gear train between clutch 70 and coil 46 and connecting compass 76 to this gear train. Then the indication would orient itself so that the top of the screen would correspond to the heading of the airplane. In such case, the north direction would be shown on the screen by a dial like 75 or by other suitable means.

In order to produce radio lighthouse indications it will be recalled that the sweep circuit at the indicator must take into consideration the distance C indicated in Fig. 1. Since the receiver is normally on a moving craft this distance must be continuously determined. In accordance with my invention, when the beam of the lighthouse 8 actually sweeps over the observer's airplane 9, certain additional steps are performed for the purpose of determining the airplane's self-position. One of these special operations, the determination of self-azimuth, is performed during every sub-cycle, that is every 3PR and RLS operation. The other special operation, the determination of self-distance, is performed by the notch follow-up unit 77 which is actuated only during the 3PR operations or sub-cycles during which the beam is over the plane 9. A description of a 3PR operation or sub-cycle will, therefore, serve to illustrate both these operations.

In general, this sub-cycle takes place like any other 3PR sub-cycle. Because of the fact that the powerful microwave beam pulses 1 directly from the lighthouse 8 strike the airplane 9 during this cycle, certain additional actions take place.

When such a powerful microwave beam pulse 1 arrives at the observer's plane 9, it is picked up by antenna 54 and received by receiver 55. From the output of this receiver, the powerful pulse passes through W1 width selector 56 to trigger transmitter 58 thus causing the emission of a re-radiated pulse 3, as previously described. Aside from producing this response, however, two other important effects are produced in the observer's airplane. One of these effects provides a determination of self-azimuth and the other provides a determination of self-distance.

For the purpose of self-azimuth determination, the powerful pulse from receiver 55 is applied to maximum signal selector 59 which is biased to select only the most powerful of the pulses delivered during one complete rotational cycle. From the output of this selector 59, the pulse is delivered to start-stop clutch 78 over line 79. This start-stop clutch is similar to clutch 70 previously referred to and is driven by the same motor 72. The output shaft 80 is, therefore, synchronized in essentially the same manner as the output shaft of 73, excepting that the reference point for the synchronization is not the instant when the lighthouse beam passes North, but rather the instant when his beam sweeps over the observer's airplane 9. Thus, the angular position of the output shaft 80 of this clutch 78 constantly corresponds with angle $p$, Fig. 1. Since the angle $p$ is one of the parameters required in the case of RLS operation, the rotation of this shaft is suitable for application to the cubic-law sweep-curving circuit 68.

The other parameter required by this sweep-curving circuit 68 is the radial distance of the observer's airplane from the lighthouse. This parameter also is obtained during the brief period when the lighthouse beam is sweeping past the observer's airplane. Only the 3PR type of operations occurring during this interval are employed, thus greatly reducing the number of pulses applied to the notch follow-up 77 so as to improve the operation of the latter.

In order to thus pass only the response pulses 3 emitted from the lighthouse during the instants of alignment of the beam 15 with the observer's own airplane, gate circuit 51 is provided which opens only when it simultaneously receives signal voltages from control signal timer 39 and maximum signal selector 59 applied over branch line 81. Since the selector 59 delivers signals only when the strong pulses of the direct beam strikes the airplane, while timer 39 delivers its gating and blocking control signals only during cycles of the 3PR type, it will be clear that gate 51 will pass only the maximum pulses occurring during the 3PR interval. Extra security is provided by the special width selector 65 which will pass only the response pulses 4 of width W3.

Referring now to Fig. 1, it will be seen that when the beam is directed at plane 9 the only microwave (F1) signals which are received simultaneously with the direct powerful microwave beam pulses 1 are the response pulses 4 which represent the radial positions of the three airplanes assumed to be aligned at that azimuth angle. In the receiver equipment of Fig. 3, therefore, the only pulses which can pass from receiver 55 through the special width selector 65 and gate 51 are the three successive response pulses 4 representing the radio positions of these three airplanes.

To provide the necessary reference pulse for the notch follow-up unit 77, the synchronizing pulse 2 from the output of width selector 37 is delivered to this unit 77 over line 82.

Figure 5:
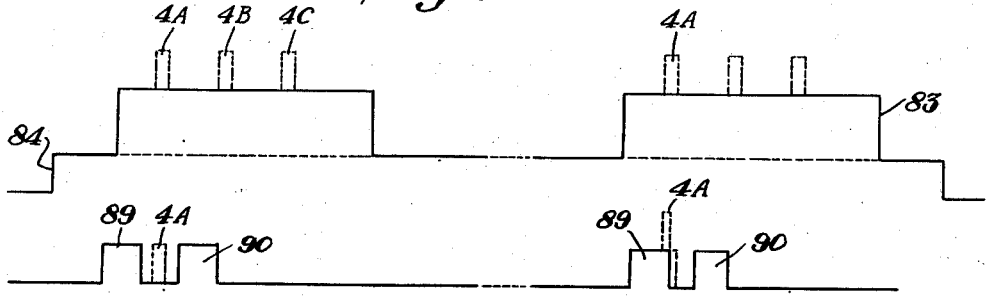
Fig. 5 is a set of curves used in explaining the operation of the circuit of Fig. 4.

The control signal timer pulses applied to gate circuit 51 over line 50 are timed with the synchronizing pulses 2 of width W2. These timer pulses are medium width rectangular pulses 83 of Fig. 5. These pulses 83 occur only during the time when the beam 15 is being keyed for the three-path radar operation, so that only the pulses occurring during this time interval of the 3PR operation will be present while these keyed pulses 83 are being applied to gate 51. Furthermore, the maximum selector circuit 59 shown in Fig. 3 also will produce a controlling pulse only during the relative narrow interval when the microwave beam is directed toward the indicating receiver. This pulse while relatively short with respect to a complete rotation cycle is quite long with respect to pulses 83 and may be represented at 84 of Fig. 5. These two positive pulses 83 and 84 serve to bias gate circuit 51 to pass the received signal pulses incoming from width selector 65. As shown in Fig. 5, there are three such response pulses 4A, 4B and 4C. For the purposes of the notch gate system, it is desired that only one of these three pulses be selected to the exclusion of the others.

Figure 4:
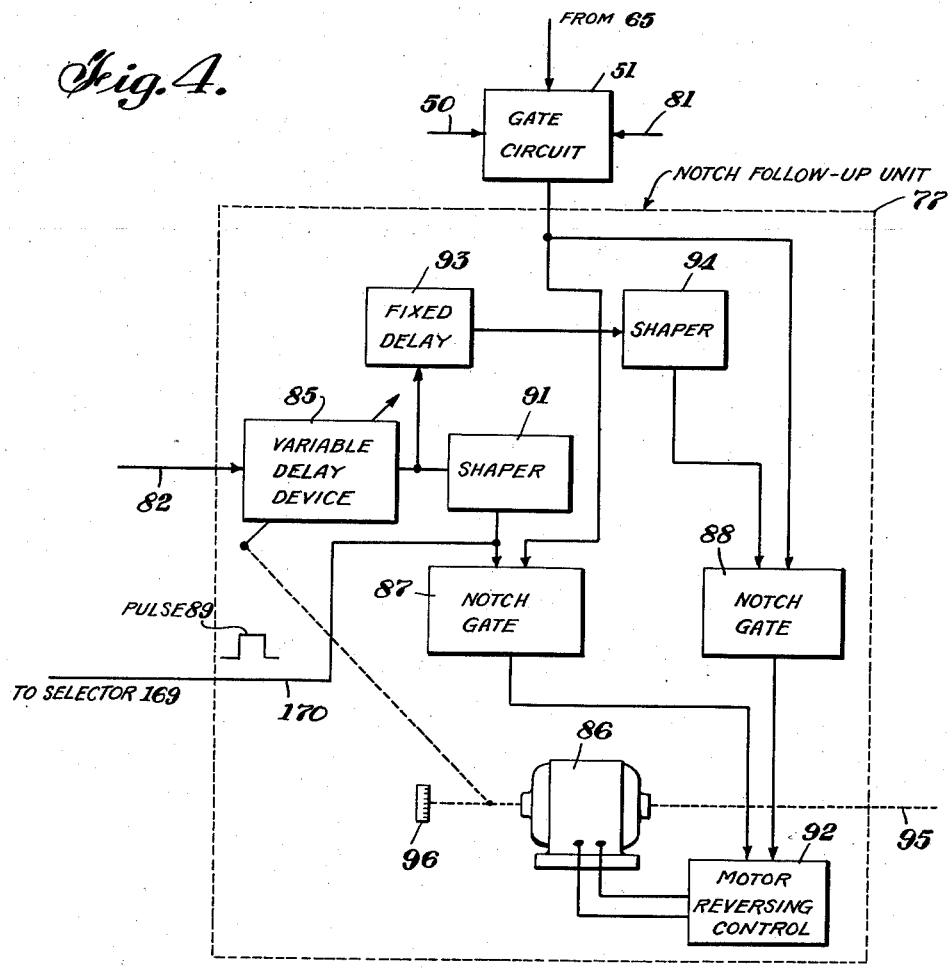
Fig. 4 is a circuit diagram illustrating the notch follow-up circuit shown as a part of the diagram of Fig. 3.

If it is assumed that pulse 4A is the repeated pulse corresponding to the transmission from the observer's plane 9, then this pulse should be selected. In order to secure this selection and to have the device follow it up so as to maintain the indication in a position representative of distance, the notch follow-up unit 77 is provided. As shown in Fig. 4, the selected synchronizing pulses 2 of width W2 may be applied over line 82 to a variable delay device 85. This variable delay device is driven by a motor 86 which rotates to advance the delay of the variable delay device one-half the width of the selected response pulse 4A for each normal rotation of the radio beacon, when driven in one direction and retard the delay one-half this distance when driven in the other direction. The selected pulses 4A therefore are caused normally to fall between two control pulses applied to notch gate circuits 87, 88.

These gate control pulses are shown in Fig. 5 at 89 and 90. Pulses 89 and 90 may be derived directly from the incoming sync. pulses 2. The output of the variable delay device 85 which may, for example, be a trigger circuit of the multivibrator type, will generally be relatively wide pulses with sloping sides. In order that they may be used properly for control, these pulses must be narrowed down preferably to a width less than the normal separation that is to be maintained between craft using the system. It will be clear, however, that these pulses should be sufficiently long in time duration so that the craft will not pass beyond such a pulse in two or three seconds of time. This is desirable since, should the signal fade for two or three revolutions of the lighthouse transmitter, the craft might pass completely beyond the notch gate control unit and so the follow-up could not be properly performed. Accordingly, the pulses from the output of delay device 85 are passed through a shaper network 91 which serves to reshape these output pulses and narrow them down. These output pulses from 91 are applied to notch gate 87 so as to bias it sufficiently positive to pass any pulses applied thereto. Thus, any response pulses 4 from gate circuit 51 which occur during the application of pulse 89 to notch gate 87 will therefore be passed on to the motor reversing control mechanism 92.

Output pulses from delay device 85 are also applied over a fixed delay circuit 93 to a second shaper circuit 94 and from there to notch gate 88. These pulses correspond to 90 shown in Fig. 5 and are delayed sufficiently to provide a time gap greater than the width of output pulses from gate circuit 51. Pulses from 51 are also applied to notch gate 88 and, if they are applied during the interval when pulses 90 are present, from there to motor reversing control 92 to cause motor 86 to operate one revolution in the opposite direction to that produced by pulses from notch gate 87. It will therefore be seen that as long as response pulse 4A is properly timed with respect to pulses 89 and 90 that the motor 86 will remain stationary and its shaft 95 will correspond in angular position to the distance of the receiver from the radio lighthouse station. However, as the craft carrying the receiver moves, the pulse 4A may be displaced to one side as shown in the right hand side of Fig. 5 causing pulse 4A to overlap pulse 89. This increased voltage will be passed through notch gate 87 and applied to the motor reversing control causing motor 86 to operate in one direction for one revolution. This will displace the variable delay device sufficient to move the notch gate pulses 89 and 90 over one-half the width of pulse 89. Accordingly, if the craft does not move the next revolution of the beacon, the pulse 4A will again fall within the notch and the shaft will remain stationary. However, if the craft continues to move in distance tending to displace pulse 4A, the gate pulses 89 and 90 will tend to follow it up so as to maintain shaft 95 at all times substantially aligned with the distance indication.

The notch gate pulses 89 and 90 are initially lined up by means of a manual control knob 96. This knob may be controlled in position by observation of the indications produced on the cathode ray tube 43, adjustment being made until such time as the indications properly coincide with the position on the map. It will be clear that if desired the entire notch follow-up unit may be eliminated and manual adjustments made for every reading that is to be taken. This, however, entails rather tedious observation of the instrument and does not permit such rapid operation as is desired.

If no fading of the signal need be anticipated the notch gate system may be considerably simplified. With such an arrangement only one notch gate pulsing circuit need be provided instead of the two shown in Fig. 4. Motor 86 may then be made normally to advance the notch one-half the width of the applied pulses for each rotation of the beacon. Should a pulse fail to appear on the notch gate, the motor may then be caused to rotate backwards one revolution thus stepping the delay device back one step. This would thus keep shaft 95 hunting a small distance back and forth across the receiving distance. However, the use of a single pulse would also permit the distance measurements to be made more accurately so that less separation between craft in the same azimuth direction could be tolerated.

In the foregoing description of the RLS type of operation, the manner of operation of the sweep curving circuit 68 of Fig. 3 was not described, but it was merely assumed that this circuit produced the necessary correcting voltage under control of shafts representing angle $p$ and distance C respectively, Fig. 1. The required correcting voltage was then described as being combined in circuit 45 with the linear saw-tooth sweep voltage from sweep circuit 38. The combining circuit 45 was also assumed to properly restore the zero axis in known manner. The resulting output in circuit 45 was then assumed to correspond to the required cubic-law sweep-voltage.

In order to consider more specifically the manner of attainment of these sweep voltages, the trigonometric relationships of Fig. 1 will be considered. In the triangle whose sides are C, M and P, and whose opposite angles are c, m and p, respectively, the usual cosine law for determination of one side (in terms of the other two sides and the angle included between them) may be written as follows:

$$P = \sqrt{C^2 + M^2 - 2CM \cos P}$$

if D represents the difference between the paths of the direct pulse from L to A and the indirect pulse from L via O in Fig. 1, it is clear that $D = P + M - C$; and if $\Delta$ is the corresponding observed delay between the arrivals of the direct and indirect pulses $$\Delta = (P + M - C) \div v$$

(where $v$ is the velocity of propagation in miles per microsecond, i. e. approximately .186). From the definitions of D and $\Delta$, it is clear that $$P = C + D - M = C + v\Delta - M$$

Substituting this value for P in the original equation, we obtain $$C + v\Delta - M = \sqrt{C^2 + M^2 - 2CM \cos p}$$

This equation may be solved for M to yield $$M = \tfrac{1}{2} v\Delta (v\Delta + 2C) \div (v\Delta + 2C \text{ hav } p)$$

This is the basic cubic equation which determines the shapes of the sweep curves, since it defines the radial distance M of any obstacle with respect to the lighthouse in terms of the airplane's own radial distance C, the readily measurable angle $p$ and the observed pulse delay $\Delta$. This equation, however, expresses the distance of the object directly in miles.

In order to determine the corresponding deflection voltage required, it is necessary to assume a scale factor S which may be defined as the number of volts which must be applied to the oscilloscope indicator unit in order to produce the amount of deflection which is desired for representing one mile distance. If it is desired, for instance, to employ a scale of three miles to the inch, and if the sensitivity of the indicator is such that 30 volts are required for one inch of deflection, the factor S would correspond to 10 volts per indicated mile. Inserting this scale factor S in the last derived equation, this may be written $$SM = \tfrac{1}{2} S v\Delta (v\Delta + 2C) \div (v\Delta + 2C \text{ hav } p)$$

Since SM is the deflection voltage which must be applied to the oscilloscope indicator at the instant when the reflected pulse from the obstacle O is received (i. e. the deflection voltage required $\Delta$ microseconds after the commencement of the cycle), it is clear that this equation defines the voltage-time relationship required for the cubic-law sweep. This equation may be written in the form $$SM = [\tfrac{1}{2} S v\Delta] - \left[\frac{1}{\tfrac{1}{2} S v\Delta + SC \text{ hav } p}\right] \times$$

$$[\tfrac{1}{4} S^2 C^2 \sin^2 p] + \left[\frac{\tfrac{1}{4} S^2 C^2 \sin^2 p}{SC \text{ hav } p}\right]$$

This latter form of the equation most clearly represents the manner in which the desired voltages are produced.

Considering the four terms shown in squared brackets, it will be clear that the first term represents merely a linear sweep such as the output of circuit 38 in Fig. 3. The second bracketed term is a fraction whose denominator consists of this same linear sweep voltage plus a constant voltage dependent upon distance C and angle $p$. The third bracketed term is a multiplying factor depending again upon C and $p$. The fourth bracketed term is equal and opposite to the value of all the rest of the equation at the start of the cycle (i. e. when $\Delta = 0$). Thus, this fourth bracketed term represents merely a D. C. restoring action, or shift of axis sufficient to bring the starting value of the whole sweep voltage to 0.

Referring to Fig. 6, the circuit elements shown within the dot-dash lines represent one possible form of sweep-curving circuit which may be employed for unit 68 of Fig. 3. The shafts 95 and 80 entering this unit in Fig. 3 are again shown in Fig. 6.

The potentiometers 97, 98 and 99 are endless potentiometers whose sliders 100, 101 and 102 can turn continuously in one direction and whose windings 103, 104 and 105 form closed arcs tapped at two diametrically opposite points. Potentiometer 99 may be a low resistance potentiometer having such a taper as to deliver over line 106 a voltage proportionate to SC when its shaft 95 is maintained at an angle corresponding to the distance C. Potentiometer 97 has a much higher impedance winding, tapered so as to produce a voltage dividing action proportionate to the haversine of the angle assumed by its output shaft 80. The bias voltage SC hav $p$ from the output of potentiometer 97 is added to the saw-tooth sweep voltage arriving from circuit 38 by means of a simple diode-and-condenser circuit 107, 108 of the type usually used for D. C. restoration, thus resulting in a voltage $\tfrac{1}{2} Sv\Delta - SC$ hav $p$.

The only element of the circuit requiring special comment is the tube 109 which is a cathode ray type of tube having a target electrode 110, somewhat similar to the known "monoscope" tubes employed for television testing. This type of tube can be designed to produce any desired functional relationship between the output voltage delivered by the target electrode and the deflected position of the cathode ray beam. Ordinarily, these tubes are arranged to give two-dimensional patterns. In the present application, the tube is arranged to yield an output voltage which varies according to the reciprocal law with respect to the deflection voltages applied to one pair of deflection plates 111. The other deflecting plates 112 could be left at fixed potential so that the cathode ray beam would sweep across a single line of the target. Preferably, however, a beam spreading oscillation from oscillator 113 is applied to these other plates 112 so as to spread the beam out into a wide flat fan which could be swept across the target under the control of the combined voltages of potentiometer 97 and sweep circuit 38.

The output from the target of monoscope or tube 109 is amplified in a stabilized amplifier 114 whose gain is accurately varied by the shaft 95 so as to maintain this gain equal to $S^2C^2$. The attenuating potentiometer 98 may be tapered to provide a transmission factor proportionate to $\tfrac{1}{4} \sin^2 p$.

The output from the complete cubic-law sweep-curving circuit 68 above described may now be combined with the saw-tooth sweep from circuit 38 of Fig. 3 in the combining and D. C. restoring circuit 45; and the resultant voltage delivered will be of the proper form for application to an electrostatically controlled oscilloscope. For magnetically controlled oscilloscope operation, a power amplifier 115 with suitable pre-distortion to compensate for the inductance of the deflection coil 46 is incorporated in the output circuit in known manner.

The circuit of Fig. 7 showing a typical width selector which may be used, preferably includes a limit clipping stage 116 as an input coupler which limits all input pulses to substantially the same amplitude. Should the input pulses be of a positive polarity as indicated by the pulses of curve 9a in Fig. 8, the clipping stage 116 also serves to reverse the polarity as indicated by the pulses of curve 9b. This output pulse energy from stage 116 is applied over connection 117 through a resistor R to a shock excitable L-C circuit 118. Connected across the tunable circuit 118 is a vacuum tube 119, the cathode 120 of which is connected to the input side of the circuit 118, while the anode 121 is connected to the opposite side 122 of said circuit. The side 122 is also connected to a source of anode potential 123. The pulse energy, curve 9b, from the connection 117 is applied to the grid of tube 119 so as to block the conduction between the cathode 120 and the anode 121 while pulse energy is applied to the side 122. The undulations produced in the circuit 118 in response to pulse energy over connection 117 are taken off through a connection 124 for application to a threshold clipping amplifier stage 125. The bias on the grid 126 is controlled by adjustment of resistor 127. In the output 128 of stage 125 is a pulse width shaper 129 the operation of which is hereinafter described.

Assume for purposes of illustration, that the widths of the pulses of curves 9a and 9b correspond, respectively, to different pulse widths W1, W2, W3, W4 and W5. Assume also that the circuit 118 is tuned for selection of pulse width W3. Curve 9c represents the output of the circuit 118 when this circuit is tuned for selection of pulse width W3, illustrating the different output undulations for the different pulse widths of curve 9b. When the leading edge 130 of the pulse W3 is applied at negative polarity circuit 118, an initial undulation 131 is produced which is normally followed by undulations 132, 133 and so on in the form of a damped wave. When the circuit is tuned to a frequency the period of which is exactly twice the width W3, the trailing edge 134 occurs where the initiated oscillatory energy crosses the zero axis from undulation 131 to undulation 132. Since the trailing edge 134 shock excites the circuit in the same direction at this point, the undulation 135 produced thereby in the circuit 118 adds algebraically to the undulation 132 to produce undulation 136. The next succeeding pairs of undulations produced by the leading and trailing edges of pulse width W3 would normally tend to produce a negative undulation 137 which would continue as a damped wave as indicated at 138. The damping tube 119, however, eliminates the trailing oscillations so that they do not interfere with the undulations produced by subsequent pulses applied to the circuit 118.

A pulse width less than pulse width W3 such, for example, as pulse widths W1 and W2, will not produce maximum undulations as great as the undulation 136 for the tuning adjustment corresponding to pulse width W3. This is illustrated by the undulations 139 and 140 produced in response to the pulse width W1 and W2, respectively. The reason for this is readily apparent because the shock excitations produced by the leading and trailing edges of the pulses of lesser width than W3 are in part opposed to each other as indicated by the broken lines associated with the undulations 139 and 140. The undulations 141 and 142 produced in response to the greater pulse widths W4 and W5 are likewise smaller than the undulation 136 since here again the oscillations produced in response to the leading and trailing edges of the greater pulse widths are in part opposed to each other so that the algebraic summation thereof is less than in the case of the undulations produced in response to pulse width W3.

The threshold clipping stage 125 is adjusted to clip at a level 143 thereby obtaining and amplifying the crest portion 136A of the undulation 136 as indicated by curve 9d. The pulse shaper 129 is preferably of the character adapted to differentiate the pulse 136A producing the pulse shape 136B of curve 9e. The shaper also includes a clipper stage for clipping the positive pulse portion of pulse shape 136B at level 144 thereby producing a narrow width pulse 136C synchronized in time to the pulse width W3. It will be apparent that by adjusting the tuning of circuit 118 to another frequency the period of which is twice the duration of any one of the other pulse widths of curve 9b, that a corresponding output pulse will be produced representing the pulses of the pulse width selected. If two pulses differing little in width from one another are to be passed by the same width discriminator then the clipping level 143 may be adjusted to select the two corresponding undulation peaks which will differ little in amplitude.

Figure 9:
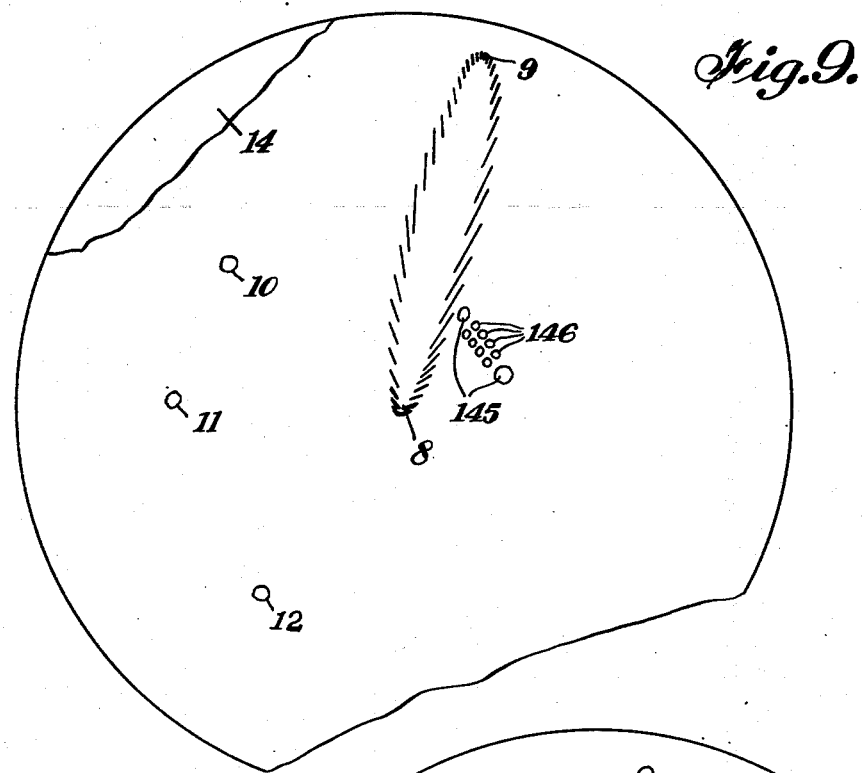
Figs. 9 and 10 are illustrative diagrams of the oscilloscope pattern traced by the radio lighthouse and three-path radar display circuits respectively.
Figure 10:
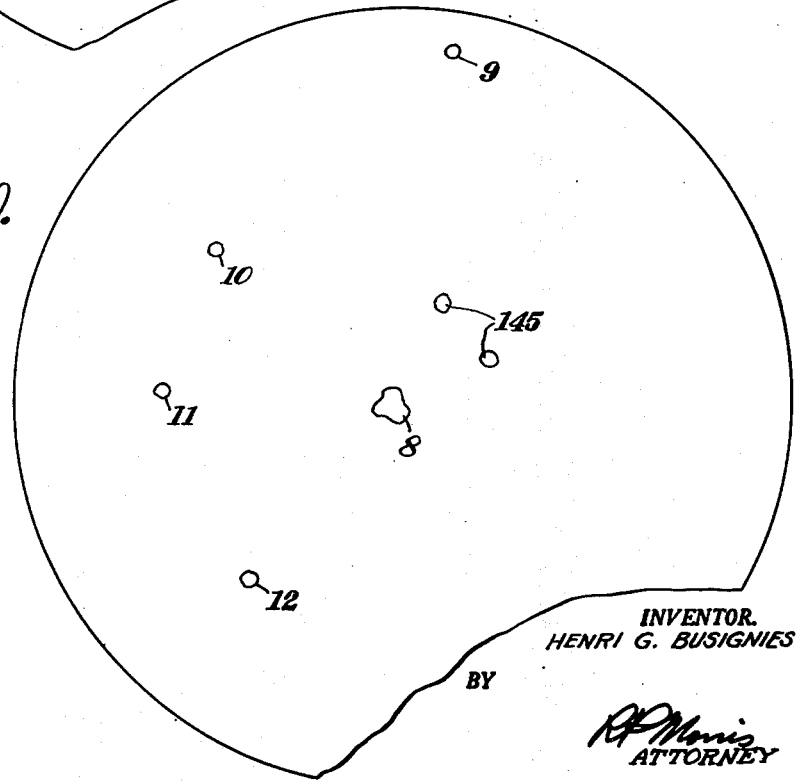

The displays on the cathode ray oscilloscope screen will be of the form shown in Figs. 9 and 10. Fig. 9 illustrates the RLS type of display, while Fig. 10 illustrates the corresponding 3PR display.

For the sake of simplicity, the number of features to be shown has been reduced to the minimum. It is assumed that the equipment has been adjusted for a large scale display, covering a relatively short radius around the lighthouse. There is here represented the observer's airplane 9, three other airplanes 10, 11, 12, all of which have moved to positions different from that indicated in Fig. 1, the mountain 14, two active ground repeaters 145, marking the ends of the runway, an eight parasitic repeaters 146 marking the boundaries of such runway are represented in Fig. 9. It will be understood, however, that switching arrangements will be provided which will enable the pilot to shift to a smaller scale representation covering a larger area when this is desired.

The representations of the mountain 14 and the passive repeaters 146 may be controlled in brilliance separately from the other representations, i. e., airplanes and active repeaters. Thus, if desired the mountain and passive repeaters may be dimmed down to make the airplanes and active repeaters stand out more strikingly. If desired, the repeaters could be flashed to distinguish them from the airplanes, but even without this, the airplanes could be distinguished by their motion.

The lighthouse 8 is represented by the crescent shaped bright spot at the center of the screen, while the observer's plane 9 is shown as a bright spot at the other end of the faint feathery ellipse shown in Fig. 9. This feathery ellipse represents the blind spot previously mentioned, which is inherent in the RLS type of display. A hazy ellipse joining the lighthouse and the observer's receiver will ordinarily be seen, although its brilliance may become vanishingly low half-way between the two ends. Inside this ellipse no representations of any obstacles or any airplanes can be seen by the RLS principle.

The 3PR type of display illustrated in Fig. 10 provides a very satisfactory method of eliminating the blind spot of the RLS display just discussed. Since this 3PR display is essentially like a retransmitted radar, but with the weaker pulses and half tone effects eliminated, its only blind spot is the normal small circular splash in the center of the screen which represents the position of the lighthouse 8. All airplanes 10, 11, 12 flying outside of this center splash will be clearly shown, perhaps with even higher definition than the representations of the RLS display.

The one important shortcoming of the 3PR type of display when used alone, is that it gives no positive indication as to which is the observer's aircraft. Thus, a pilot looking at the representation of Fig. 10 alone, would not be able to determine simply and with certainty which of the spots represented himself. By combining the indications of Figs. 9 and 10 on one screen, however, the principal disadvantages of both types of displays are eliminated. In addition, several other valuable advantages result.

In the first place, it becomes much easier for the pilot to notice immediately any distortion of the indications of the RLS display, since the two types of displays are superposed and thus, distortion of one results in a very noticeable lack of registry. It has been stated that one of the most basic reasons for selecting the RLS principle as a basis for a flying aid, is the fact that any malfunctioning of any part of the system will necessarily result in a distortion of the disp'ay. It would be possible to check such distortion by comparing the display of Fig. 9 with a printed map, showing the lighthouse, the mountain, the two ground repeaters and the passive repeaters which outline the runway. (In practice, of course, many more representations of each of these kinds would be present.) This, however, would require the superposition of the map upon the screen in order to make it reasonably convenient.

The two displays could be shown alternately at intervals corresponding to the rotation of the lighthouse beam (e. g. about 50 times per minute), but in the present embodiment, it is assumed that these two displays are interleaved at the pulsing rate of 1200 times a second so that they appear to be simultaneously present.

While the foregoing description has concerned itself with the indications produced on the screen of one observer plane, it will be apparent that such indications will be produced on any number of suitable equipped planes.

In the lighthouse station, the display there produced of all objects in the vicinity thereof may operate on the radar principle for all planes and on quasi-radar for the repeater planes. In the radar operation the microwave beam pulses 1 are sent out and the echo pulses (reflected pulses 7) are received. By noting the time delay between these the distance of the various objects from the lighthouse is determined. The lighthouse station may include a cathode ray tube with a linear sweep and a rotating deflection coil. The rotation of the coil is synchronized with the rotation of beam 15 so that the azimuth of various objects is thus suitably indicated on the cathode ray tube.

In the quasi-radar operation, microwave beam pulses 1 are sent out, and reradiated pulses 3 are received. The time delay between these is used as the measure of distance of the objects. The azimuth is determined in the manner hereinabove indicated.

PART II

*Changes and additions in accordance with the present invention*

In accordance with the present invention, the following changes and additions are made in the equipment heretofore described in order to enable the obtaining of the additional services in accordance with the present invention.

The changes and additions are indicated in Figs. 2, 3 and 4 in heavy lines and details of the changes and additions which are made for rendering these additional services are illustrated and further described in Figs. 12-15.

In the lighthouse equipment 16 (Fig. 2), the antenna 60, which in the present system is a directional antenna, replaces the omni-directional antenna described in my aforesaid copending application. This antenna 60 rotates in synchronism with the rotating beam radiator 29 as indicated by the broken line 147. The purpose of this change is to decrease interference between the reradiated pulses 3, radiated successively by airplanes as the microwave beam 15 sweeps past them and triggers them with microwave beam pulses 1, and the new F1 coded response pulses (responding to coded command pulses) arriving in a direction dependent on the azimuth of a particular airplane being spotted. The reception directions of these two sets of pulses (the reradiated pulses 3 and the coded response pulses) will in general not coincide, one direction being (temporarily) fixed, the other varying periorically over 360°. When the beam 15 does coincide with the spotting direction, the system is so arranged—as described later—that no coded response pulses are emitted by that airplane.

In addition, in the lighthouse equipment, a new antenna 148 which has a directive radiant action pattern is added. The orientation of antenna 148 is controlled by the spotter, via a telemotor remote-positioning control 149 and may be set to the direction of any selected plane as determined from its position on the ground display repeater 150 which is connected to the ground display 62 of the lighthouse, the ground display repeater 150 being arranged in front of the spotter enabling him to observe the disposition of various objects around the lighthouse. Antenna 148 is energized from the U. H. F. transmitter 31 through an electronic switch 151 and coupler 152, being momentarily substituted in place of the omni-directional antenna 32 at the instant when coded command pulses are to be radiated.

The spotter has in front of him a spotting control 153 which includes an azimuth spotter 154 which operates as shown by the broken line 155 to control telemotor control 149 and control the azimuth along which the antenna 148 points. This selects the azimuth of the plane to which signals are to be sent. The spotter also has in front of him a radial distance spotter 156 which determines the radial distance of the plane which is to receive the coded command pulses. In addition, a command coder 157 is used to control the pulses to determine the specific command desired.

The output of the radial distance spotter 156 in the output of the command coder 157 is used to control a code timer and modulator 158 which in turn operates on U. H. F. transmitter 31 to cause the radiation of code pulses at a distinct time with reference to a given reference pulse (sync. pulses 2 of the 3PR operation) so as to determine the radial distance of the plane to which the coded command is sent and to also determine the specific command transmitted.

The foregoing will be better understood from the following explanation. The coded command pulses which are radiated at frequency F2, are radiated only after 3PR sync. pulses 2 (F2, W2, omni.) not after RLS special sync. pulses 6 (F2, W4, omni.). The reason for this is that during the RLS operation or sub-cycle, each airplane is picking up reradiated pulses 3 (F2, W1) direct from other airplanes, and interference might occur on airplanes between such random reradiated pulses 3 and the coded F2 response pulses being radiated from an airplane being spotted. During 3PR sub-cycles, each airplane is blocked as far as reception of reradiated pulses 3 is concerned by the operation of sync. pulse 2 on the control signal timer 39, which in turn sends out such blocking voltages, since during the 3PR sub-cycle, the reradiated pulses 3 are intended for reception only by the lighthouse, for subsequent retransmission as response pulses 4.

Each coded command signal may consist for example, of two extra narrow pulses 159 and 160 (see Fig. 12) which are spaced fairly close so that the whole coded command signal is only a few microseconds long. The time between these two coded pulses is controlled according to the particular command to be given to the spotted airplane. The time between pulses 159 and 160 is controlled by the spotter who operates the command coder 157. While pulses 159 and 160 are both very narrow, it is preferred to distinguish between these two pulses by making them of different widths, that is, pulse 159 has a width W6 which is wider than the width W7 of pulse 160.

The pulses are generated and controlled in command coder 157 by any suitable means such as for example, that illustrated in Fig. 11. Referring now to Fig. 11, a pair of sine wave generators 161 and 162 are synchronized together as indicated by the broken line 163, and have their outputs respectively fed to gate clippers 164 and 165 respectively. Gate clipper 164 operates at such level as to produce pulses of a width W6 or coded pulses 159 while gate clipper 165 operates at a level to produce somewhat narrower pulses of width W7 or pulses 160. The output of gate clipper 164 is fed through a coupler 166 to the code timer and modulator 158. The output of gate clipper 165 is fed through a variable delay device 167 to coupler 166 and then to code timer and modulator 158. The variable delay device 167 is manually controlled by the spotter. At the output of coupler 166 each pulse of width W6 is followed after a delay determined by the setting of variable delay device 167 by a pulse of width W7. The spacing between pulse 159 and the following pulse 160 is varied to produce different commands as will be apparent hereinafter.

The code pulses 159 and 160 are fed by command coder 157 through the code timer and modulator 158 to modulate the transmitter 31 and also to operate electronic switch 151 so that the output of transmitter 31 is fed via coupler 152 to spotting antenna 148. To select the specific plane which is to be spotted, the azimuth spotter 154 is operated to control through telemotor control 149 the direction to which antenna 148 points. To locate the selected plane, the radial distance of the plane must also be taken account of. This is done in the radial distance spotter 156 which controls code timer and modulator 158 in accordance with the selection of the spotter to time the pairs of code pulses 159 and 160 with relation to the sync. pulses 2. For this purpose the code timer and modulator is synchronized as indicated by broken line 168 with the rotation of motor 25 which in turn is synchronized by a control circuit 17 with the transmission of synchronizing pulses 2. By adjusting the radial distance spotter 156, the amount the code pulses are delayed with respect to the sync. pulse 2 which they follow, is varied, as for example, by means of a variable delay device in code timer and modulator 158. This delay serves to select the particular radial distance of the plane which will respond to the spotted command signals. This will be explained more fully in connection with the description of the receiving equipment in the plane (Fig. 3).

Referring now to Fig. 3 in the plane, the sync. pulses and the coded pulses are received on antenna 34 and pass through coupler 35 and receiver 36. The sync. pulse 2 arrives first and passes through the W2 width selector 37 to the notch follow-up unit 77. Referring now to Fig. 4, it will be seen that this sync. pulse 2 passes through the variable delay device 85 and shaper 91 and then goes back to coded command signal selector 169. The sync. pulse 2 just described which arrived at antenna 34 (see Fig. 3) and then is fed back to selector 169 over line 170 from the notch follow-up unit 77 after a certain amount of delay then arrives at the coded command signal selector 169, in the form of pulse 89 (see Figs. 4, 5 and 12). Selector 169 includes a gate. Pulse 89 which is the output pulse along line 170 from notch follow-up unit 77, corresponding to the sync. pulse 2, but delayed a certain amount, then appears at the gate at a given time. If code pulses 159 and 160 arrive during the time that pulse 89 is at the selector 169, pulses 159 and 160 are then raised in amplitude by pulse 89 so as to pass through the gate at the level indicated by the dotted line 170. If, however, the code pulses 159 and 160 do not coincide with pulse 89, they will not pass through the gate in selector 169. It will be remembered that the variable delay device 85 in the notch follow-up unit of Fig. 4 is varied in accordance with the radial distance of the plane from the lighthouse. Accordingly the amount of delay introduced by the variable delay device of each airplane will vary according to its radial distance. Thus the spotter in the lighthouse, by varying the spacing between the sync. pulse 2 and the coded pulses 159 and 160, in accordance with the radial distance of the plane to be spotted, determines that the pulse 89 from the notch follow-up unit 77 which is produced as a result of sync. pulses 2, and is delayed by variable delay device 85 in the notch follow-up unit in respect to sync. pulse 2, shall coincide in the gate of selector 169 with code pulses 159 and 160 only when the variable delay device is set to a given value. This given value is the value of the delay device when the plane in which it is located is at the selected radius from the lighthouse.

To further assure that unwanted pulses are not sent through selector 169, said selector also includes a width selector which will permit the passage of widths W6 and W7 (since both widths are very close to each other), while excluding all other pulse widths. The two pulses 159 and 160 are then set to a decoder 171 and from said decoder 171 to an indicator 172 and a coded response pulse generator 173.

Referring now to Fig. 13, the decoder 171 may consist for example, of a plurality of width selectors 174, each tuned to a different pulse width. These selectors may be similar to the pulse width selector described in connection with Figs. 7 and 8 but differ in that they are tuned not to measure the pulse width of pulse 159 or pulse 160 but instead to measure the total width between these pulses. Each of these width selectors is adapted to respond to different spacings between pulses 159 and 160 so that depending upon the spacing between each pair of pulses 159 and 160, a different width selector will produce a response in its output line 175. Each of the output lines 175 is in turn connected through a relay 176 to actuate a lamp 177. The spotter in the lighthouse 16 by operating the command coder 157 to produce different spacings between a pair of pulses 159 and 160 causes different ones of the lamps 177 in the indicator 172 to light. By suitable combinations of lit lamps 177, various commands may be given, such as commands to tune in on different voice channels.

The coded pulse output of selector 169 may also be fed through the coder over line 178 to the coded response pulse generator 173.

The coded response pulse generator 173 is controlled by a barometric control 189 (overoid, for example) and an identification modulator 190, which may for example, be of the type indicated in Fig. 14.

The code pulses along line 178 are fed to a W6 width selector 181 which only lets pulses 159 through. These pulses 159 then trigger a sine wave generator 182 to produce a sine output which is fed to a gate clipper 183. The output of gate clipper 183 are pulses of any desired width which may be for example, of width W8, which may be a very narrow pulse slightly different in width from width W6 or width W7. These pulses of width W8, hereinafter referred to as "coded response pulses 184" are directed through a coupler 185 to the output line 186 of the coded response pulse generator. Coded response pulses 184 are also fed through a variable delay device 187 and an amplifier 188 as well as coupler 185 over line 186. It will thus be seen that for every pulse 184 emitted from gate clipper 183, two pulses 184 are produced along line 186, the spacing between the two pulses depending on the amount of delay of the variable delay device 187. The variable delay device 187 is in turn controlled by the barometric control 189 which varies with the altitude and changes the delay in accordance with the altitude. Thus the spacing between the pair of pulses travelling along line 186, is indicative of the altitude of the plane. It is to be noted that each pair of such pulses 184 along line 186 are produced by a single W6 width pulse injected into the generator 182. Consequently these pairs of pulses are spaced some distance apart as are successive W6 width pulses. This is of some importance since in the receiver, the indication produced depends upon the spacing between the pair of pulses and if the pairs of pulses were not separated from each other, the indication would be confusing. The pairs of pulses 184 along line 186 which, due to their spacing, carry an indication of altitude, are fed through a switch 190. The switch 190 is opened and closed by an identification modulator 191 which operates at a relatively very slow speed, such as for example, the speed of telegraphy. The identification modulator 191 may operate according to the Morse code or according to the Daudot code to produce successive dots or dots and dashes which will identify the plane. Each dot consists of a great many pairs of the coded response pulses 184 transmitted over line 186 while the dashes are relatively greater. The identification modulator 191 may consist of a rotating cam which is shaped to produce the desired identification dot or dot and dash signals, by either raised portions or notches therein. The output of switch 190 is fed over line 192 through a gate 193 (see Fig. 3) to modulate transmitter 58 and cause said transmitter to emit the coded response pulses by the coupler 35 and antenna 34. The gate 193 is closed by voltages from a blocking control voltage source 194 whenever the airplane must respond to microwave beam pulses 1 by reradiation of reradiated pulses 3. Since the position of shaft 80 represents the self-azimuth of the airplane, by comparison of the time when the microwave beam 15 intercepts the airplane with the time when the north synchronizing signal is received, the position of this shaft may also be used to control the blocking control 194.

At the lighthouse the response pulses 184 are received on antenna 148 (see Fig. 2), passed through coupler 152 to the ultra high frequency receiver 195 and thence through a W8 width selector 196 to the decoder indicator 197. The decoder indicator 197 is shown in detail in Fig. 15.

Figure 15:
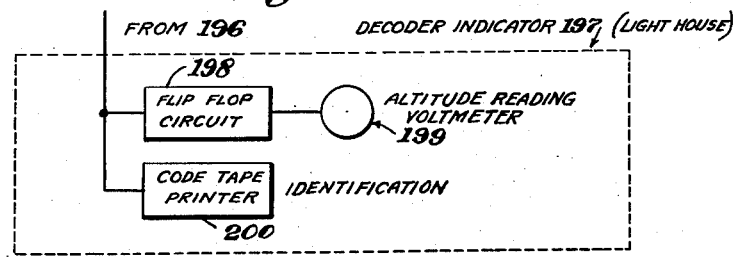
Fig. 15 is a block diagram of one form of decoder indicator that may be employed in the equipment of Fig. 2.

Referring now to Fig. 15, only the pulses of width W8 or pulses 184 will pass through the width selector 196 to the decoder indicator 197. This eliminates possible interference from pulses of other widths. Each pair of the pulses 184 is used to operate a flip flop multivibrator circuit 198 with the first of the pair "flipping" the circuit and the second of the pair "flopping" it to produce an output pulse from said circuit 198 whose width is determined by the spacing between the pulses of the pair. It will be remembered that the spacing between the pulses of each pair of pulses 184 indicates altitude. Therefore the output of the flip flop circuit 198 is fed to a voltmeter 199 which sums up the total energy of the output pulse of flip flop circuit 198 and gives a reading which can be calibrated in altitude to show the altitude of the plane which has been spotted. The pairs of pulses 184 are also fed to some code indicator which may be, for example, a code tape printer 200. The code tape printer 200 does not respond to the individual pairs of pulses 184 but integrates these as a group to produce indications in the form of dots or dots and dashes, each of which correspond to a large number of pairs of pulses 184. By an examination of the response of code tape printer 200, the plane can be identified.

From the foregoing it will be seen that in accordance with my invention the spotter may, by pushing buttons or similar automatic means not involving the use of voice, select a plane and command said plane to use a certain voice channel as well as cause said plane to response and give its altitude and identification. While I have described the specific details of various devices used in connection with one embodiment of my invention, it will be apparent that not only may the details of the specific devices be varied but that also the devices themselves be interchanged with similarly functioning devices without departing from the teachings of my invention. Accordingly, while I have described above the principles of my invention in connection with specific apparatus, it is to be clearly understood that this description is made only by way of example and not as a limitation on the scope of my invention.

I claim:

1. In a radio indicating system, an indicator at a given location, means for indicating on said indicator in response to energy radiated from substantially said location, objects around said indicator, means at substantially the same location as said indicator for transmitting a signal having characteristics corresponding to the azimuth and range from said location of a selected one of said objects, and means on said selected object for automatically responding only to a signal having characteristics corresponding to its azimuth and range from said location.

2. In a radio indicating system, an indicator at a given location, means for indicating on said indicator objects around it, means at substantially the same location as said indicator for transmitting a signal having characteristics corresponding to the azimuth and range from said location of a selected one of said objects, and means on said selected object for automatically sending a response signal back to said location only in response to a transmitted signal having characteristics corresponding to its azimuth and range from said location.

3. A radio indicating system according to claim 2 further including means at substantially said given location for receiving and translating said response signal.

4. A radio indicating system according to claim 2 wherein said transmitting means includes means for impressing the transmitted signal with a selected message-conveying characteristic, and further including means at said selected one of said objects for producing a response determined by said characteristic.

5. A radio indicating system according to claim 2 further including means on said selected object for impressing said response signal with a given characteristic individual to said selected object, and means substantially at said given location for receiving said response signal, and for producing a response determined by said characteristic.

6. A radio indicating system according to claim 2 wherein said transmitting means at said location includes means for generating a signal, means for impressing said signal with a selected message-conveying characteristic, means for impressing said signal with a selected radial distance characteristic corresponding to the radial distance of a selected one of said objects from said location, means for transmitting said signal in a directional beam, and means for controlling the direction of said beam to determine the azimuth along which the signal is sent out; further including means at said object for receiving said signals, means at said selected object responsive to said distance characteristic corresponding to its radial distance from said location for selecting said signal, means responsive to the selected signal for producing a response determined by said message characteristic, means also responsive to said selected signal for transmitting a response signal, and means for impressing said response signal with a characteristic individual to said object; and further including means substantially at said indicator location for receiving and translating the response signal.

7. A radio indicating system according to claim 2 wherein said transmitting means at said location includes means for generating a plurality of pulses, means for impressing said pulses with a selected message-conveying characteristic, means for impressing said pulses with a selected radial distance characteristic, means for transmitting said pulses in a directional beam, and means for controlling the direction of said beam to determine the azimuth along which the pulses are sent out; further including means at said selected object for receiving said pulses, means responsive to said selected radial distance characteristic for selecting said pulses, means responsive to the selected pulses for producing a response determined by said message-conveying characteristic, means also responsive to the selected pulses for transmitting a plurality of response pulses, and means for impressing said response pulses with a characteristic individual to said object; and means substantially at said indication location for receiving and translating said response pulses.

8. A radio indicating system according to claim 2 wherein said transmitting means includes means for generating a plurality of pulses, means for spacing said pulses according to a selected message to be conveyed, means for further spacing said pulses according to the selected radial distance of the object to which they are directed, means for transmitting said pulses in a directional beam, and means for controlling the direction of said beam to determine the azimuth along which the pulses are sent out; further including means on said selected object for receiving said pulses, means responsive to the radial distance spacing between certain of said pulses for selecting said pulses, means responsive to the selected pulses for producing a response determined by the message-conveying spacing therebetween.

9. A radio indicating system according to claim 2 wherein said transmitting means includes means for generating a series of spaced synchronizing pulses, means for generating a plurality of spaced pairs of code pulses, means for determining the spacing between the code pulses of each pair to convey a selected message, means for transmitting signals in a directional beam, means for alternately feeding synchronizing pulses and pairs of code pulses to the beam transmitting means, means for controlling the direction of said beam to determine the azimuth along which the pulses are sent out, means for controlling the spacing between each of said synchronizing pulses and its succeeding pair of code pulses to determine the radial distance of the object to which it is directed; further including means at said object for receiving said pulses, a variable delay device adjusted to a value corresponding to the radial position of the object from said indicator location, means for feeding said synchronizing pulses through the variable delay device, a normally closed gate, means for feeding the delayed output pulses from said delay device to each momentarily open said gate, means for feeding one of said pairs of code pulses through said gate each time it is opened, means responsive to said pairs of code pulses for producing a response determined by the spacing between the code pulses of said pair, means responsive to one code pulse of each of said pairs for emitting a pair of response pulses, the succeeding code pulses producing a train of pairs of response pulses, means responsive to the altitude of said objects to determine the spacing between the response pulses of said pair, means for transmitting said response pulses, and means characteristic of the identity of the object for interrupting the trains of response pulses according to an individual pattern; and further including directive means substantially at said indicator location for receiving said response pulses, means responsive to the spacing between the response pulses of each pair for indicating the altitude of said objects, and means responsive to the pattern of the train of response pulses to indicate the identification of said objects.

10. In a radio indicating system wherein a plurality of objects about a predetermined location are indicated at said location, certain of said objects being provided with means for transmitting predetermined characteristic signals responsive only to predetermined individual signals; a system for obtaining a response at said location from a selected one of said objects comprising means for transmitting to said one object an individual signal in an angularly moving directive pattern characterized with said one object's distance with respect to said location, and means for receiving said predetermined characteristic signal, and means for translating said predetermined characteristic received signal.

11. A radio indicating system according to claim 10 wherein said transmitting means comprises means for transmitting a plurality of signals, means for impressing said signals with a selected message conveying characteristic, means for impressing said signals with a selected radial distance characteristic, means for transmitting said signals in a directional beam, and means for controlling the direction of said beam to determine the azimuth along which the signals are sent.

12. A radio indicating system according to claim 10 wherein said transmitting means includes means for generating a plurality of pulses, means for spacing said pulses in accordance with a selected message conveying characteristic, means for further spacing said pulses in accordance with a selected radial distance characteristic, means for transmitting said pulses in a directional beam, and means for controlling the direction of said beam to transmit said pulses along the azimuth of said selected object with respect to said predetermined location.

13. A radio indicating system according to claim 10 wherein said transmitting means includes means for generating a series of spaced synchronizing pulses, means for generating a plurality of spaced pairs of code pulses, means for determining the spacing between the code pulses of each pair to convey a selected message, means for transmitting signals in a directional beam, means for alternately feeding synchronizing pulses and pairs of code pulses to the beam transmitting means, means for controlling the direction of said beam to direct it along the azimuth of said selected objects with respect to said predetermined location, and means for controlling the spacing between each of said synchronizing pulses and its succeeding pair of code pulses in accordance with the radial distance of the selected object from said predetermined location.

14. In a radio indicating system wherein a plurality of objects about a predetermined location are indicated at said location, and means are provided at said location for sending a series of spaced synchronizing pulses and a series of spaced pairs of code pulses, with each pair of code pulses following one of said synchronizing pulses, and the spacing between the code pulses and the synchronizing pulses being selected in accordance with the radial distance of the selected object to which they are directed, and the spacing between the code pulses of each pair being determined in accordance with the message to be conveyed, and means further provided at said location for receiving and translating response pulses from said objects; a system at said selected object for emitting response signals comprising, means for receiving said pulses, a variable delay device adjusted to a value corresponding to the radial position of said object from said predetermined location, means for feeding said synchronizing pulses through said variable delay device, a normally closed gate, means for feeding the delayed output pulses from said device to each momentarily open said gate, means for feeding one of said pairs of code pulses through said gate each time it is opened, means responsive to said pairs of code pulses for producing a response determined by the spacing between the code pulses of said pair, means responsive to one code pulse of each of said pairs for emitting a pair of responsive pulses, the succeeding code pulses producing a train of pairs of response pulses, means responsive to the altitude of said object for determining the spacing between the response pulses of each pair, means for transmitting said response pulses, means characteristic of the identity of said object for interrupting the train of response pulses according to an individual pattern indicative of the identification of said object.

15. A radio indicating system, comprising means at a given location for selectively interrogating objects around said location comprising means for transmitting a synchronizing signal omni-directionally, means for transmitting a second signal spaced from said first named signal in an angularly moving directive pattern, means for controlling the spacing between said synchronizing signal and said second signal in accordance with the radial distance of a selected object from said location, means for transmitting in an angularly moving directive pattern a third signal spaced from said second signal, means for controlling the spacing between said second and third signals in accordance with a predetermined code corresponding to different information, means at each of said objects for receiving said transmitted signals, means at a selected object for selecting said second and third signals comprising means for delaying said received synchronizing signal in accordance with the radial distance of said selected object from said location, means responsive to said delayed signal and said second and third signals for selecting said second and third signals, means responsive to the spacing between said second and third signals for translating said information.

16. An arrangement according to claim 15, further comprising means at each of said objects for transmitting information in response to the information of said selected second and third signals.

HENRI G. BUSIGNIES.

(References on following page)

References Cited

The following references are of record in the file of this patent:

UNITED STATES PATENTS

| Number | Name | Date |
|---|---|---|
| 1,894,019 | Buckley | Jan. 10, 1933 |
| 2,132,559 | Baumann | Oct. 11, 1938 |
| 2,171,293 | Plastino | Aug. 29, 1939 |
| 2,252,083 | Luck | Aug. 12, 1941 |
| 2,321,698 | Nolde | June 15, 1943 |
| 2,402,459 | Smith | June 18, 1946 |
| 2,405,231 | Newhouse | Aug. 6, 1946 |
| 2,417,032 | Wolff | Mar. 4, 1947 |
| 2,436,846 | Williams | Mar. 2, 1948 |
| 2,444,452 | Labin | July 6, 1948 |

FOREIGN PATENTS

| Number | Country | Date |
|---|---|---|
| 520,778 | Great Britain | May 3, 1940 |